United States Patent
Wang et al.

(10) Patent No.: US 11,055,770 B2
(45) Date of Patent: Jul. 6, 2021

(54) METHOD, APPARATUS AND SYSTEM FOR GENERATING COLLOCATION RENDERINGS

(71) Applicant: Alibaba Group Holding Limited, Grand Cayman (KY)

(72) Inventors: Xiaobei Wang, Zhejiang (CN); Tao Fang, Zhejiang (CN); Ruhua Huang, Zhejiang (CN)

(73) Assignee: Alibaba Group Holding Limited, Grand Cayman (KY)

( * ) Notice: Subject to any disclaimer, the term of this patent is extended or adjusted under 35 U.S.C. 154(b) by 122 days.

(21) Appl. No.: 16/206,819

(22) Filed: Nov. 30, 2018

(65) Prior Publication Data

US 2019/0095985 A1 Mar. 28, 2019

Related U.S. Application Data

(63) Continuation of application No. PCT/CN2017/085282, filed on May 22, 2017.

(30) Foreign Application Priority Data

Jun. 2, 2016 (CN) .......................... 201610387618.7

(51) Int. Cl.
*G06Q 30/06* (2012.01)
*G06T 7/73* (2017.01)
(Continued)

(52) U.S. Cl.
CPC ..... *G06Q 30/0643* (2013.01); *G06Q 30/0633* (2013.01); *G06T 7/73* (2017.01);
(Continued)

(58) Field of Classification Search
CPC ............ G06Q 30/0643; G06Q 30/0633; G06T 11/60; G06T 11/001; G06T 19/20;
(Continued)

(56) References Cited

U.S. PATENT DOCUMENTS 6,026,376 A 2/2000 Kenney
8,065,200 B2 11/2011 Schwartz
(Continued)

FOREIGN PATENT DOCUMENTS

CN 101770621 A 7/2010
CN 101770652 A * 7/2010
(Continued)

OTHER PUBLICATIONS

CN-101770652-A (Machine Translation on Jun. 1, 2020) (Year: 2010).*
(Continued)

*Primary Examiner* — Michael Le
(74) *Attorney, Agent, or Firm* — Lee & Hayes, P.C.

(57) ABSTRACT

A method for generating a collocation rendering including acquiring a list of to-be-collocated transaction objects and acquiring a preset collocation template; and generating image information of a collocation rendering of the to-be-collocated transaction objects according to collocation attribute information of the to-be-collocated transaction objects and the preset collocation template. By means of the above technical solution, a plurality of transaction objects are automatically combined and collocated into a scene, thus allowing a user to appreciate a rendering effect of collocating the plurality of transaction objects together.

20 Claims, 15 Drawing Sheets

(51) Int. Cl.
*G06T 15/00* (2011.01)
*G06T 11/00* (2006.01)
*G06T 11/60* (2006.01)
*G06T 19/20* (2011.01)

(52) U.S. Cl.
CPC .............. *G06T 11/00* (2013.01); *G06T 11/60* (2013.01); *G06T 15/005* (2013.01); *G06T 19/20* (2013.01); *G06T 2210/04* (2013.01); *G06T 2215/16* (2013.01); *G06T 2219/2004* (2013.01)

(58) Field of Classification Search
CPC ......... G06T 11/00; G06T 7/73; G06T 15/005; G06T 2210/04; G06T 2215/16; G06T 2219/2024; G06T 2219/2004; G06F 3/1454
See application file for complete search history.

(56) References Cited

U.S. PATENT DOCUMENTS

| | | | |
|---|---|---|---|
| 9,563,929 B1* | 2/2017 | Sokolowski | G06T 1/20 |
| 2005/0177463 A1* | 8/2005 | Crutchfield, Jr. | G06Q 30/0643 705/26.9 |
| 2009/0262195 A1* | 10/2009 | Yoshida | H04N 7/185 348/159 |
| 2011/0025714 A1* | 2/2011 | Ptucha | G09G 5/14 345/641 |
| 2011/0157227 A1* | 6/2011 | Ptucha | H04N 5/232 345/638 |
| 2012/0020648 A1* | 1/2012 | Yamaji | G11B 27/034 386/278 |
| 2012/0223943 A1 | 9/2012 | Williams et al. | |
| 2013/0317950 A1 | 11/2013 | Abraham et al. | |
| 2017/0249693 A1 | 8/2017 | Greenwood et al. | |

FOREIGN PATENT DOCUMENTS

| | | | |
|---|---|---|---|
| CN | 101770652 A | | 7/2010 |
| CN | 103544621 A | * | 1/2014 |
| CN | 103544621 A | | 1/2014 |
| CN | 104246813 A | | 12/2014 |
| CN | 105205684 A | | 12/2015 |
| EP | 1229498 A2 | | 8/2002 |
| JP | 2002269408 A | | 9/2002 |
| JP | 2011198112 A | | 10/2011 |
| WO | WO2005041099 A1 | | 5/2005 |

OTHER PUBLICATIONS

CN-103544621-A (Machine Translation on Jun. 1, 2020) (Year: 2014).*
Translation of CN Office Action from Corresponding CN Application No. 201610387618.7 dated Jan. 19, 2020, a counterpart foreign application for U.S. Appl. No. 16/206,819 , 31 pages.
Translation of Search Report for corresponding PCT Application PCT/CN2017/085282, dated Dec. 2, 2018, a counterpart foreign application for U.S. Appl. No. 16/206,819 , 5 pages.
Translation of Written Opinion for corresponding PCT Application PCT/CN2017/085282, dated Dec. 4, 2018, a counterpart foreign application for U.S. Appl. No. 16/206,819 , 4 pages.
Translation of CN Office Action from Corresponding CN Application No. 201610387618.7 dated Jan. 8, 2020, a counterpart foreign application for U.S. Appl. No. 16/206,819 , 2 pages.
Machine translation of second CN Office Action from Corresponding CN Application No. 201610387618.7 dated Jul. 1, 2020, a counterpart foreign application for U.S. Appl. No. 16/206,819, 34 pages.
Japanese Office Action dated Apr. 6, 2021 for Japanese Application No. 2018-563114, a foreign counterpart applicaiton of U.S. Appl. No. 16/206,819, 7 pages.

* cited by examiner

METHOD, APPARATUS AND SYSTEM FOR GENERATING COLLOCATION RENDERINGS

CROSS REFERENCE TO RELATED PATENT APPLICATIONS

This application claims priority to and is a continuation of PCT Patent Application No. PCT/CN2017/085282, filed on May 22, 2017, which claims priority to Chinese Patent Application No. 201610387618.7 filed on Jun. 2, 2016 and entitled "METHOD, APPARATUS AND SYSTEM FOR GENERATING COLLOCATION RENDERING", which are incorporated herein by reference in their entirety.

TECHNICAL FIELD

The present disclosure relates to the field of image processing technologies, and, more particularly, to methods for generating a collocation rendering. Corresponding to such methods, the present disclosure also relates to apparatuses and electronic devices for generating a collocation rendering; methods, apparatuses and electronic devices for displaying a collocation rendering; systems for displaying a collocation rendering; methods, apparatuses and electronic devices for generating a collocation rendering of items; and methods, apparatuses and electronic devices for displaying a collocation rendering of items.

BACKGROUND

The certainty of commodities shopped for online is unknown before a user receives the commodities. Therefore, users hope to know a real effect of collocating multiple commodities together before purchase. Commodities need to be collocated for display in lots of scenes of e-commerce platforms. For example, a plurality of related commodities (household supplies such as a sofa, a tea table, a cabinet and an adornment picture) purchased by a user need to be collocated for display. A plurality of related commodities included in a collocation package (apparel and accessories such as clothing, shoes, glasses and a backpack) provided by a merchant need to be collocated for display, and so on.

At present, a collocation rendering provided by a tool of an e-commerce platform for establishing a collocation rendering of commodities for users is mainly a collocation rendering in the form of an image list. The users cannot see a real collocation effect of collocating commodities together from such a collocation rendering in the form of an image list. Thus, the possibility of a buyer purchasing more commodities at a time is reduced.

In summary, the conventional techniques have a problem that a collocation rendering of a plurality of transaction objects cannot be automatically generated.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides a method for generating a collocation rendering, so as to solve the problem in the conventional techniques that a collocation rendering of a plurality of transaction objects cannot be automatically generated. The present disclosure further provides an apparatus and an electronic device for generating a collocation rendering; a method, an apparatus and an electronic device for displaying a collocation rendering; a system for displaying a collocation rendering; a method, an apparatus and an electronic device for generating a collocation rendering of items; and a method, an apparatus and an electronic device for displaying a collocation rendering of items.

The present disclosure provides a method for generating a collocation rendering, including:

acquiring a list of to-be-collocated transaction objects and acquiring a preset collocation template; and generating image information of a collocation rendering of the to-be-collocated transaction objects according to collocation attribute information of the to-be-collocated transaction objects and the preset collocation template.

Optionally, the collocation attribute information includes spatial position attributes, and the preset collocation template includes spatial position information; and the step of generating image information of a collocation rendering of the to-be-collocated transaction objects includes:

filling, according to the spatial position attributes of the to-be-collocated transaction objects and a pre-generated collocation rule set, images of the to-be-collocated transaction objects into corresponding spatial positions of the preset collocation template; and generating image information of the collocation rendering according to the preset collocation template into which the images have been filled.

Optionally, the spatial position information includes ground area position information and/or wall area position information.

Optionally, the collocation attribute information includes category attributes, and the preset collocation template includes layout modes of transaction objects of a preset class; and the step of generating image information of a collocation rendering of the to-be-collocated transaction objects includes:

filling, according to the category attributes of the to-be-collocated transaction objects, images of the to-be-collocated transaction objects into corresponding spatial positions of the preset collocation template; and generating image information of the collocation rendering according to the preset collocation template into which the images have been filled.

Optionally, the layout mode includes an image layer identifier, an image layer position and an image layer size of an image layer, where an image of a transaction object of the preset class is located, in the collocation rendering.

Optionally, the step of filling images of the to-be-collocated transaction objects into corresponding spatial positions of the preset collocation template employs the following manner:

filling the images of the to-be-collocated transaction objects into different image layers of the preset collocation template.

Optionally, the image information of the collocation rendering includes layout information of the collocation rendering; and the step of generating image information of the collocation rendering according to the preset collocation template into which the images have been filled includes:

extracting a corresponding relation between the images and layout modes of the images from the preset collocation template into which the images have been filled; and using the extracted corresponding relation as the layout information of the collocation rendering.

Optionally, there is an overlapping relation between different image layers.

Optionally, the images include static images or dynamic images, the static images including images with transparent data.

Optionally, the step of acquiring a list of to-be-collocated transaction objects and acquiring a preset collocation template includes:

receiving a collocation rendering displaying request which is sent by a client terminal and corresponds to the list of to-be-collocated transaction objects and the preset collocation template; and acquiring the list of to-be-collocated transaction objects and the preset collocation template according to the collocation rendering displaying request.

Optionally, after the step of generating a collocation rendering of the to-be-collocated transaction objects, the method further includes:

returning the image information of the collocation rendering to the client terminal.

Optionally, the image information of the collocation rendering includes a picture of the collocation rendering or layout information of the collocation rendering; and the layout information of the collocation rendering includes a corresponding relation between images of the to-be-collocated transaction objects and layout modes of the images of the to-be-collocated transaction objects in the collocation rendering.

Optionally, the to-be-collocated transaction objects include transaction objects for house decoration.

Correspondingly, the present disclosure further provides an apparatus for generating a collocation rendering, including:

a transaction object and collocation template acquiring unit configured to acquire a list of to-be-collocated transaction objects and acquire a preset collocation template; and a collocation rendering generating unit configured to generate image information of a collocation rendering of the to-be-collocated transaction objects according to collocation attribute information of the to-be-collocated transaction objects and the preset collocation template.

Optionally, the collocation attribute information includes spatial position attributes, and the preset collocation template includes spatial position information; and the collocation rendering generating unit includes:

a filling subunit configured to fill, according to the spatial position attributes of the to-be-collocated transaction objects and a pre-generated collocation rule set, images of the to-be-collocated transaction objects into corresponding spatial positions of the preset collocation template; and a generating subunit configured to generate image information of the collocation rendering according to the preset collocation template into which the images have been filled.

Optionally, the collocation attribute information includes category attributes, and the preset collocation template includes layout modes of transaction objects of a preset class; and the collocation rendering generating unit includes:

a filling subunit configured to fill, according to the category attributes of the to-be-collocated transaction objects, images of the to-be-collocated transaction objects into corresponding spatial positions of the preset collocation template; and a generating subunit configured to generate image information of the collocation rendering according to the preset collocation template into which the images have been filled.

Optionally, the filling subunit is configured to fill the images of the to-be-collocated transaction objects into different image layers of the preset collocation template.

Optionally, the image information of the collocation rendering includes layout information of the collocation rendering; and the generating subunit includes:

an extracting subunit configured to extract a corresponding relation between the images and layout modes of the images from the preset collocation template into which the images have been filled; and a setting subunit configured to use the extracted corresponding relation as the layout information of the collocation rendering.

Optionally, the transaction object and collocation template acquiring unit includes:

a receiving subunit configured to receive a collocation rendering displaying request which is sent by a client terminal and corresponding to the list of to-be-collocated transaction objects and the preset collocation template; and an extracting subunit configured to acquire the list of to-be-collocated transaction objects and the preset collocation template according to the collocation rendering displaying request.

Correspondingly, the present disclosure further provides an electronic device, including:

a display;

a processor; and memory, the memory being configured to store a program of a method for generating a collocation rendering, wherein after being powered on and running the program of the method for generating a collocation rendering, the device performs the following steps: acquiring a list of to-be-collocated transaction objects and acquiring a preset collocation template; and generating image information of a collocation rendering of the to-be-collocated transaction objects according to collocation attribute information of the to-be-collocated transaction objects and the preset collocation template.

Correspondingly, the present disclosure further provides a method for displaying a collocation rendering, including:

sending, to a server, a collocation rendering displaying request corresponding to a list of specific to-be-collocated transaction objects and a specific preset collocation template;

receiving image information of a collocation rendering which is returned by the server and corresponding to the collocation rendering displaying request; and displaying the collocation rendering according to the image information of the collocation rendering.

Optionally, the image information of the collocation rendering includes a picture of the collocation rendering or layout information of the collocation rendering.

Optionally, the layout information of the collocation rendering includes a corresponding relation between images of the to-be-collocated transaction objects and layout modes of the images of the to-be-collocated transaction objects in the collocation rendering; and the step of displaying the collocation rendering employs the following manner:

displaying the collocation rendering according to the corresponding relation.

Optionally, the step of displaying the collocation rendering according to the corresponding relation includes:

acquiring layout modes of the images of the to-be-collocated transaction objects in the collocation rendering according to the corresponding relation, the layout mode including an image layer identifier, an image layer position and an image layer size of an image layer, in the collocation rendering, where an image of a to-be-collocated transaction object is located; and displaying the images of the to-be-collocated transaction objects in an image container according to the layout modes corresponding to the images of the to-be-collocated transaction objects.

Optionally, the step of displaying the images of the to-be-collocated transaction objects in an image container employs the following manner:

displaying the images of the to-be-collocated transaction objects in the image container sequentially by taking an ascending order of the image layer identifiers as an image display order.

Optionally, before the step of displaying the images of the to-be-collocated transaction objects, the method further includes:

displaying, according to a background picture included in information of the collocation rendering, the background picture in the image container.

Optionally, the method further includes:

receiving a list page display instruction sent by a user; and displaying a list page of the to-be-collocated transaction objects in a preset list manner according to the layout information of the collocation rendering.

Optionally, the step of displaying a list page of the to-be-collocated transaction objects in a preset list manner includes:

acquiring images of the to-be-collocated transaction objects according to the layout information of the collocation rendering;

establishing a list page image layer, and arranging the images of the to-be-collocated transaction objects on the list page image layer in the preset list manner; and displaying the list page image layer.

Optionally, the step of displaying the list page image layer employs the following manner:

stacking the list page image layer above the image layers of the collocation rendering.

Optionally, the list page image layer is of the same size as the image layers of the collocation rendering.

Optionally, the preset list manner includes an ascending manner or a descending manner of image layer identifiers of image layers corresponding to images of the to-be-collocated transaction objects.

Optionally, after the step of receiving a list page display instruction sent by a user, the method further includes:

determining whether an image layer currently displayed is an image layer of the collocation rendering; and if yes, performing the next step.

Optionally, the manner of sending the list page display instruction includes a manner of sending the instruction through a preset gesture.

Optionally, the step of displaying a list page of the to-be-collocated transaction objects employs the following manner:

displaying the list page of the to-be-collocated transaction objects in a dynamic-effect manner if the manner of sending the list page display instruction is a specific gesture corresponding to a spread dynamic-effect manner.

Optionally, after the step of displaying a list page of the to-be-collocated transaction objects in a preset list manner, the method further includes:

receiving an instruction of displaying the collocation rendering sent by a user; and closing the list page.

Optionally, after the step of receiving an instruction of displaying a collocation rendering sent by a user, the method further includes:

determining whether an image layer currently displayed is an image layer of the list page; and if yes, performing the next step.

Optionally, the manner of sending the instruction of displaying a collocation rendering includes a manner of sending the instruction through a preset gesture.

Optionally, the list page includes a list page with a preset transparency.

Optionally, the method is applied to a mobile smart device or a desktop computing device.

Correspondingly, the present disclosure further provides an apparatus for displaying a collocation rendering, including:

a request sending unit configured to send, to a server, a collocation rendering displaying request corresponding to a list of specific to-be-collocated transaction objects and a specific preset collocation template;

an image information receiving unit configured to receive image information of a collocation rendering which is returned by the server and corresponding to the collocation rendering displaying request; and an image displaying unit configured to display the collocation rendering according to the image information of the collocation rendering.

Optionally, the image information of the collocation rendering includes a picture of the collocation rendering or layout information of the collocation rendering;

the layout information of the collocation rendering includes a corresponding relation between images of the to-be-collocated transaction objects and layout modes of the images of the to-be-collocated transaction objects in the collocation rendering;

the image displaying unit is configured to display the collocation rendering according to the corresponding relation; and the image displaying unit includes:

an acquiring subunit configured to acquire layout modes of the images of the to-be-collocated transaction objects in the collocation rendering according to the corresponding relation, the layout mode including an image layer identifier, an image layer position and an image layer size of an image layer, in the collocation rendering, where an image of a to-be-collocated transaction object is located; and a first display subunit configured to display the images of the to-be-collocated transaction objects in an image container according to the layout modes corresponding to the images of the to-be-collocated transaction objects.

Optionally, the image information of the collocation rendering includes a picture of the collocation rendering or layout information of the collocation rendering; and the apparatus further includes:

a first instruction receiving unit configured to receive a list page display instruction sent by a user; and a list page display unit configured to display a list page of the to-be-collocated transaction objects in a preset list manner according to the layout information of the collocation rendering.

Optionally, the list page display unit includes:

an acquiring subunit configured to acquire images of the to-be-collocated transaction objects according to the layout information of the collocation rendering;

an arranging subunit configured to establish a list page image layer, and arrange the images of the to-be-collocated transaction objects on the list page image layer in the preset list manner; and a display subunit configured to display the list page image layer.

Optionally, the display subunit is configured to stack the list page image layer above the image layers of the collocation rendering.

Optionally, the apparatus further includes:

a second instruction receiving unit configured to receive an instruction of displaying a collocation rendering sent by a user; and a list page closing unit configured to close the list page.

Correspondingly, the present disclosure further provides an electronic device, including:

a display;

a processor; and memory configured to store a program of a method for displaying a collocation rendering, wherein after being powered on and running the program of the method for displaying a collocation rendering, the device performs the following steps: sending, to a server, a collocation rendering displaying request corresponding to a list of specific to-be-collocated transaction objects and a specific preset collocation template; receiving image information of a collocation rendering which is returned by the server and corresponding to the collocation rendering displaying request; and displaying the collocation rendering according to the image information of the collocation rendering.

Correspondingly, the present disclosure further provides a system for displaying a collocation rendering, including any of the apparatuses for generating a collocation rendering as described above; and any of the apparatuses for displaying a collocation rendering as described above.

Correspondingly, the present disclosure further provides a method for generating a collocation rendering of items, including:

filling images of to-be-displayed items into different image layers of an image container;

extracting a corresponding relation between the images of the to-be-displayed items and layout modes of the images of the to-be-displayed items from the image container into which the images have been filled, the layout mode including an image layer identifier, an image layer position and an image layer size of an image layer, in the image container, where an image of a to-be-displayed item is located; and releasing a collocation rendering of the items according to the extracted corresponding relation between the images of the to-be-displayed items and the layout modes.

Optionally, the step of filling images of to-be-displayed items into different image layers of an image container employs the following manner:

filling the images of the to-be-displayed items into random positions of the image container, images of different to-be-displayed items corresponding to different image layers; and correspondingly, the step of extracting a corresponding relation between the images of the to-be-displayed items and layout modes of the images of the to-be-displayed items from the image container into which the images have been filled includes:

determining, according to a filling order of the images of the to-be-displayed items, image identifiers of the image layers where the images of the to-be-displayed items are located;

acquiring display positions and display sizes of the image layers in the image container;

forming layout modes of the image layers according to the image layer identifiers, the display positions and the display sizes of the image layers; and forming the corresponding relation between the images of the to-be-displayed items and the layout modes according to the layout modes of the image layers and the images of the to-be-displayed items which have been filled in the image layers.

Optionally, the step of filling images of to-be-displayed items into different image layers of an image container includes:

selecting a preset collocation template, and displaying the preset collocation template in the first image container; and filling the images of the to-be-displayed items into different image layers of the preset collocation template; and correspondingly, the step of extracting a corresponding relation between the images of the to-be-displayed items and layout modes of the images of the to-be-displayed items from the image container into which the images have been filled includes:

acquiring layout modes of the preset collocation template, the layout modes of the preset collocation template including image layer identifiers, image layer positions and image layer sizes of the image layers; and forming the corresponding relation between the images of the to-be-displayed items and the layout modes according to the layout modes of the preset collocation template and the images of the to-be-displayed items which have been filled in the image layers.

Optionally, before the step of releasing a collocation rendering of the items, the method includes:

filling a background picture of the collocation rendering of the items into a background image layer of the image container.

Correspondingly, the present disclosure further provides an apparatus for generating a collocation rendering of items, including:

an image filling unit configured to fill images of to-be-displayed items into different image layers of an image container;

a corresponding relation extracting unit configured to extract a corresponding relation between the images of the to-be-displayed items and layout modes of the images of the to-be-displayed items from the image container into which the images have been filled, the layout mode including an image layer identifier, an image layer position and an image layer size of an image layer, in the image container, where an image of a to-be-displayed item is located; and an image release unit configured to release a collocation rendering of the items according to the extracted corresponding relation between the images of the to-be-displayed items and the layout modes.

Correspondingly, the present disclosure further provides an electronic device, including:

a display;

a processor; and memory configured to store a program of a method for generating a collocation rendering of items, wherein after being powered on and running the program of the method for generating a collocation rendering of items, the device performs the following steps: filling images of to-be-displayed items into different image layers of an image container; extracting a corresponding relation between the images of the to-be-displayed items and layout modes of the images of the to-be-displayed items from the image container into which the images have been filled, the layout mode including an image layer identifier, an image layer position and an image layer size of an image layer, in the image container, where an image of a to-be-displayed item is located; and releasing a collocation rendering of the items according to the extracted corresponding relation between the images of the to-be-displayed items and the layout modes.

Correspondingly, the present disclosure further provides a method for displaying a collocation rendering of items, including:

acquiring a corresponding relation between images of to-be-displayed items and layout modes which is carried in a collocation rendering of the to-be-displayed items;

acquiring, according to the corresponding relation between the images of the to-be-displayed items and the layout modes, layout modes of the images of the to-be-displayed items included in the collocation rendering of the to-be-displayed items in the collocation rendering of the to-be-displayed items, the layout mode including an image layer identifier, an image layer position and an image layer size of an image layer, in the collocation rendering of the to-be-displayed items, where an image of a to-be-displayed item is located; and displaying the images of the to-be-displayed items in an image container according to the layout modes corresponding to the images of the to-be-displayed items.

Optionally, the step of displaying the images of the to-be-displayed items in an image container employs the following manner:

displaying the images of the to-be-displayed items in the image container sequentially by taking an ascending order of the image layer identifiers as an image display order.

Optionally, before the step of displaying the images of the to-be-displayed items, the method further includes:

displaying, according to a background picture included in the collocation rendering of the to-be-displayed items, the background picture in the image container.

Optionally, the method further includes:

receiving an instruction of displaying an item list effect sent by a user; and displaying the images of the to-be-displayed items in a preset item list manner according to the corresponding relation between the images of the to-be-displayed items and the layout modes.

Optionally, the step of displaying the images of the to-be-displayed items in a preset item list manner includes:

acquiring a list of the images of the to-be-displayed items according to the corresponding relation between the images of the to-be-displayed items and the layout modes;

establishing item list effect image layers, and arranging the images of the to-be-displayed items on the item list effect image layers in a preset item list manner; and displaying the item list effect image layers.

Optionally, the step of displaying the item list effect image layers employs the following manner:

overlapping the item list effect image layers above item collocation effect image layers, the item collocation effect image layers referring to image layers that include the collocation rendering of the to-be-displayed items.

Optionally, the item list effect image layers are of the same size as the item collocation effect image layers.

Optionally, the preset item list manner includes an ascending manner or a descending manner of image layer identifiers of the image layers corresponding to the images of the to-be-displayed items.

Optionally, after the step of receiving an instruction of displaying an item list effect sent by a user, the method further includes:

determining whether an image layer currently displayed is an item collocation effect image layer; and if yes, performing the next step.

Optionally, the manner of sending the instruction of displaying an item list effect includes a manner of sending the instruction through a preset gesture.

Optionally, after the step of displaying the images of the to-be-displayed items in a preset item list manner, the method further includes:

receiving an instruction of displaying an item collocation effect sent by the user; and closing the item list effect image layers, and displaying the collocation rendering of the to-be-displayed items.

Optionally, after the step of receiving an instruction of displaying an item collocation effect sent by the user, the method further includes:

determining whether an image layer currently displayed is an item list effect image layer; and if yes, performing the next step.

Optionally, the manner of sending the instruction of displaying an item collocation effect includes a manner of sending the instruction through a preset gesture.

Optionally, there is an overlapping relation between different image layers.

Optionally, the images of the to-be-displayed items include static images or dynamic images, the static images including images with transparent data.

Optionally, the method is applied to a mobile smart device or a desktop computing device.

Correspondingly, the present disclosure further provides an apparatus for displaying a collocation rendering of items, including:

a corresponding relation acquiring unit configured to acquire a corresponding relation between images of to-be-displayed items and layout modes which is carried in a collocation rendering of the to-be-displayed items;

a layout mode acquiring unit configured to acquire, according to the corresponding relation between the images of the to-be-displayed items and the layout modes, layout modes of the images of the to-be-displayed items included in the collocation rendering of the to-be-displayed items in the collocation rendering of the to-be-displayed items, the layout mode including an image layer identifier, an image layer position and an image layer size of an image layer, in the collocation rendering of the to-be-displayed items, where an image of a to-be-displayed item is located; and an image displaying unit configured to display the images of the to-be-displayed items in an image container according to the layout modes corresponding to the images of the to-be-displayed items.

Optionally, the apparatus further includes:

a first instruction receiving unit configured to receive an instruction of displaying an item list effect sent by a user; and a list page display unit configured to display the images of the to-be-displayed items in a preset item list manner according to the corresponding relation between the images of the to-be-displayed items and the layout modes.

Optionally, the apparatus further includes:

a second instruction receiving unit configured to receive an instruction of displaying an item collocation effect sent by the user; and a list page closing unit configured to close the item list effect image layers, and display the collocation rendering of the to-be-displayed items.

Correspondingly, the present disclosure further provides an electronic device, including:

a display;

a processor; and memory configured to store a program of a method for displaying a collocation rendering of items, wherein after being powered on and running the program generating the method for displaying a collocation rendering of items, the device performs the following steps: filling images of to-be-displayed items into different image layers of an image container; extracting a corresponding relation between the images of the to-be-displayed items and layout modes of the images of the to-be-displayed items from the image container into which the images have been filled, the layout mode including an image layer identifier, an image layer position and an image layer size of an image layer, in the image container, where an image of a to-be-displayed item is located; and releasing a collocation rendering of the items according to the extracted corresponding relation between the images of the to-be-displayed items and the layout modes.

Compared with the conventional techniques, according to the method for generating a collocation rendering provided in the present disclosure, a list of to-be-collocated transaction objects is acquired, a preset collocation template is acquired, and image information of a collocation rendering of the to-be-collocated transaction objects is generated according to collocation attribute information of the to-be-collocated transaction objects and the preset collocation template.

By use of the method for generating a collocation rendering provided in the present disclosure, image information of a collocation rendering is generated, according to collocation attribute information of to-be-collocated transaction objects and a preset collocation template, for a plurality of to-be-collocated transaction objects which are included in a list of to-be-collocated transaction objects. In such a processing manner, a plurality of transaction objects may be automatically combined and collocated into a scene, thus allowing a user to appreciate a rendering effect of collocating the plurality of transaction objects together.

BRIEF DESCRIPTION OF THE DRAWINGS

The accompanying drawings described here are used to provide further understanding of the present disclosure, and constitute a part of the present disclosure. The example embodiments of the present disclosure are used to explain the present disclosure, and do not improperly limit the present disclosure. In the drawings.

DETAILED DESCRIPTION

Lots of specific details are described in the following descriptions to make it easy to fully understand the present disclosure. However, the present disclosure may be implemented many other manners different from those described here. Those skilled in the art may make similar promotion without departing from the connotation of the present disclosure. Therefore, the present disclosure is not limited by the specific implementation manners disclosed in the following.

The present disclosure provides a method, an apparatus and an electronic device for generating a collocation rendering; a method, an apparatus and an electronic device for displaying a collocation rendering; a system for displaying a collocation rendering; a method, an apparatus and an electronic device for generating a collocation rendering of items; and a method, an apparatus and an electronic device for displaying a collocation rendering of items.

Figure 1:
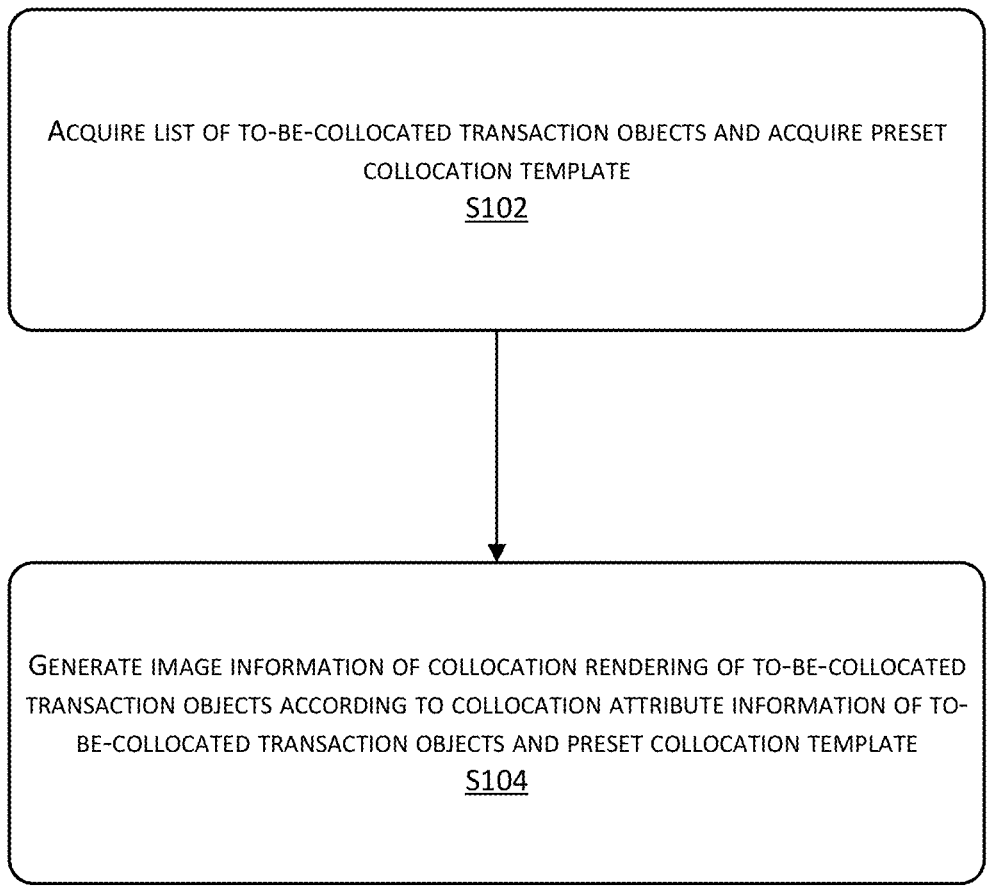
FIG. 1 is a flowchart of an example embodiment of a method for generating a collocation rendering according to the present disclosure.

Referring to FIG. 1, a flowchart of an example embodiment of a method for generating a collocation rendering according to the present disclosure is shown. The method includes the following steps:

Step S102: A list of to-be-collocated transaction objects is acquired; and a preset collocation template is acquired.

The list of to-be-collocated transaction objects includes a plurality of to-be-collocated transaction objects. The to-be-collocated transaction objects refer to transaction objects having collocation attribute information, that is, transaction objects that may be collocated with other transaction objects for display. For example, the to-be-collocated transaction objects may be transaction objects for house decoration, transaction objects of clothing, or the like. For example, the transaction objects for house decoration may include sofa, tea tables, desks, chairs, etc.; and the transaction objects of clothing may include shirts, pants, suits, ties, leather shoes, etc.

The collocation attribute information refers to information that affects collocation and display effects of the transaction objects. The collocation attribute information is a main basis for collocating and displaying the transaction objects, that is, a main basis for determining layout modes of the transaction objects in the collocation rendering.

The collocation attribute information includes, if divided in terms of acquisition manners, collocation attribute information provided by providers or demanders of the transaction objects and collocation attribute information automatically obtained by a service platform according to features of the transaction objects.

For example, collocation attribute information of a certain commodity provided by a seller (or a buyer) of an e-commerce platform is collocation attribute information provided by a provider (or a demander) of the transaction object.

For example, a seller of an e-commerce platform provides a uniform logo (e.g., iPhone6s) of a certain commodity when releasing the commodity. The e-commerce platform may acquire stored collocation attribute information of the same commodity from a commodity storage, and according to the acquired collocation attribute information, automatically obtain collocation attribute information of the commodity to be released currently.

In different application scenarios, the collocation attribute information may include different specific items. For example, the collocation attribute information of the transaction objects for house decoration includes, but is not limited to, spatial position attribute information, category attribute information, or the like, and the collocation attribute information of the transaction objects of clothing includes, but is not limited to, category attribute information, or the like.

Generally, the collocation attribute information may further include at least one of the following collocation attribute information: size information, color information, and style information. Definitely, the collocation attribute information absolutely may include other possible information. With the development of computer technologies, increasingly more collocation attribute information will be found. Therefore, increasingly more collocation attribute information may be used for collocating and displaying transaction objects.

For example, collocation attribute information of sofa, which are transaction objects of house decoration includes size information, spatial position attribute information (such as ground or wall corner), color information (such as warm color or cool color), style information (such as Chinese style, European style, Japanese style or American style), and so on. For example, collocation attribute information of shirts, which are transaction objects of clothing, includes size information (such as M or XL), color information (such as warm color or cool color), style information (such as casual wear or formal wear), and so on.

The preset collocation template defines a spatial layout mode of the collocation rendering. Different collocation templates define different spatial layout modes.

For example, the preset collocation template includes spatial position information, that is, various spatial positions of the collocation rendering have been pre-defined, and it is only necessary to fill images of the to-be-collocated transaction objects into corresponding spatial positions of the collocation template. The spatial position information includes, but is not limited to, ground area position information and/or wall area position information, that is, which areas in the collocation template are ground areas and which areas in the collocation template are wall areas are defined, and the spatial position information may further include wall corners and other position information.

For example, the preset collocation template defines a plurality of image layers and defines a category to which a transaction object corresponding to each image layer belongs, as well as an image layer identifier, an image layer position and an image layer size of each image layer. That is, a basic layout mode of the collocation rendering has been determined, and it is only necessary to fill images of the to-be-collocated transaction objects into different image layers of the collocation template.

In an actual application, a demander of the collocation rendering generally selects, according to characteristics of the to-be-collocated transaction objects, a suitable preset collocation template from a plurality of preset collocation templates which have been set in advance, so as to generate image information of the collocation rendering.

The image information of the collocation rendering refers to a representation manner of the collocation rendering, including a picture of the collocation rendering or layout information of the collocation rendering. The picture of the collocation rendering may also be referred to as a static collocation rendering. That is, the generated image information of the collocation rendering is a static picture. The layout information of the collocation rendering refers to data based on which the picture of the collocation rendering is formed. For example, the layout information of the collocation rendering includes a corresponding relation between images of the transaction objects and layout modes of the images of the transaction objects in the collocation rendering.

Compared with the concept of the static collocation rendering, the collocation rendering generated based on the layout information of the collocation rendering may be referred to as a dynamic collocation rendering. In an actual application, it may be determined according to specific requirements whether the generated image information of the collocation rendering is a picture of the collocation rendering or layout information of the collocation rendering.

In the following, the influences of the picture of the collocation rendering or the layout information of the collocation rendering on a client terminal are described respectively by taking a mobile e-commerce platform as an example.

Image information of a collocation rendering of commodities released on the mobile e-commerce platform may be a picture of the collocation rendering or layout information of the collocation rendering. The manner of releasing the picture of the collocation rendering is advantageous mainly in a relatively high efficiency of displaying images for a mobile client terminal. However, the process of switching such a static collocation rendering to a commodity list page is as follows: first of all, it is necessary to request acquiring a list of images of to-be-collocated transaction objects from a server; and then the images of the to-be-collocated transaction objects are displayed in a list manner according to the acquired list of the images of the to-be-collocated transaction objects. It is thus clear that such a switching manner has a problem that when needing to view a commodity list page, a user may acquire the images of the to-be-collocated transaction objects only by making one page jump through the server, and then the images are displayed to the user in a list manner.

When a user accesses a mobile e-commerce platform via a mobile phone for shopping, the browsing efficiency of an application program is an important indicator as the mobile phone only has one window. In order to improve the browsing efficiency, a preferred manner is generating layout information of the collocation rendering by using the method provided in the present disclosure. As the layout information of the collocation rendering includes the corresponding relation between images of the to-be-collocated transaction objects and the layout modes of the to-be-collocated transaction objects in the collocation rendering, a page request does not need to be made once again by a server terminal during the switching from the collocation rendering to a list page, thus achieving the effect of improving the browsing efficiency.

The above parts have described various concepts involved in step S102.

In an example implementation manner, this step may include the following steps: 1) receiving a collocation rendering displaying request which is sent by a client terminal and corresponding to the list of to-be-collocated transaction objects and the preset collocation template; and 2) acquiring the list of to-be-collocated transaction objects and the preset collocation template according to the collocation rendering displaying request.

The client terminal includes, but is not limited to, a mobile smart device, that is, a so-called mobile phone or smart phone, a PAD, an iPad, and so on, and further includes a personal computer and another terminal device. In such an application scenario, the method for generating a collocation rendering as described in the example embodiment of the present disclosure is generally performed by a server.

The collocation rendering displaying request may include object identifiers of the to-be-collocated transaction objects in the list of the to-be-collocated transaction objects and a template identifier of the preset collocation template. The server may acquire the list of the to-be-collocated transaction objects and the preset collocation template according to the object identifiers of the to-be-collocated transaction objects and the template identifier of the collocation template.

After the step of acquiring a list of to-be-collocated transaction objects and acquiring a preset collocation template, the method may proceed to the next step of generating image information of a collocation rendering for the to-be-collocated transaction objects which are included in the list of the to-be-collocated transaction objects.

Step S104: Image information of a collocation rendering of the to-be-collocated transaction objects is generated according to collocation attribute information of the to-be-collocated transaction objects and the preset collocation template.

In this step, image information of a collocation rendering is generated, according to spatial layout modes defined by the preset collocation template and collocation attribute information of the to-be-collocated transaction objects, for the to-be-collocated transaction objects which are included in the list of the to-be-collocated transaction objects.

It should be noted that it is necessary to generate, according to different spatial layout modes defined by the collocation template, the image information of a collocation rendering of the to-be-collocated transaction objects based on collocation attribute information of the to-be-collocated transaction objects corresponding to the spatial layout modes. Two available preset collocation templates and manners of generating a collocation rendering corresponding to the two preset collocation templates are given below.

1) The preset collocation template includes spatial position information.

The preset collocation template defines spatial position information, for example, it defines which areas are ground areas, which areas are wall areas, and which positions are wall corners. Therefore, it is necessary to fill images for the collocation template according to spatial position attributes of the transaction objects, so as to generate image information of the collocation rendering.

In an example implementation manner, the step of generating image information of the collocation rendering of the to-be-collocated transaction objects may include the following steps: 1.1) filling images of the to-be-collocated transaction objects to corresponding spatial positions of the preset collocation template according to the spatial position attributes of the to-be-collocated transaction objects and a pre-generated collocation rule set; and 1.2) generating image information of the collocation rendering according to the preset collocation template into which the images have been filled.

The pre-generated collocation rule refers to the way in which transaction objects of different classes are placed. For example, the collocation rule of class transaction objects of sofa and class transaction objects of tea table is that they are placed oppositely; the collocation rule of transaction objects of bed and transaction objects of bedside table is that one bedside table is placed on each side of the bed, and so on.

The above steps 1.1 and 1.2 are described by taking that the list of to-be-collocated transaction objects includes sofa, tea tables, tables, chairs and decorative painting home furnishings as an example. The to-be-collocated transaction objects which are included in the list of to-be-collocated transaction objects are as shown in Table 1:

TABLE 1

| List of to-be-collocated transaction objects | | | |
|---|---|---|---|
| Transaction object identifier | Transaction object name | Spatial position | Class |
| 1 | Fabric wooden sofa | Central ground | Sofa |
| 2 | Simple wooden tea table | Central ground | Tea table |
| 3 | Ikea simple table | The left front side of the sofa, partially overlapped in front of the sofa | Table |
| 4 | Single cloth chair | The right front side of the sofa, partially overlapped in front of the sofa | Chair |

TABLE 1-continued

List of to-be-collocated transaction objects

| Transaction object identifier | Transaction object name | Spatial position | Class |
| --- | --- | --- | --- |
| 5 | Print of Van Gogh decorative painting | On the wall surface at the back of the sofa | Decorative painting |

Figure 3:
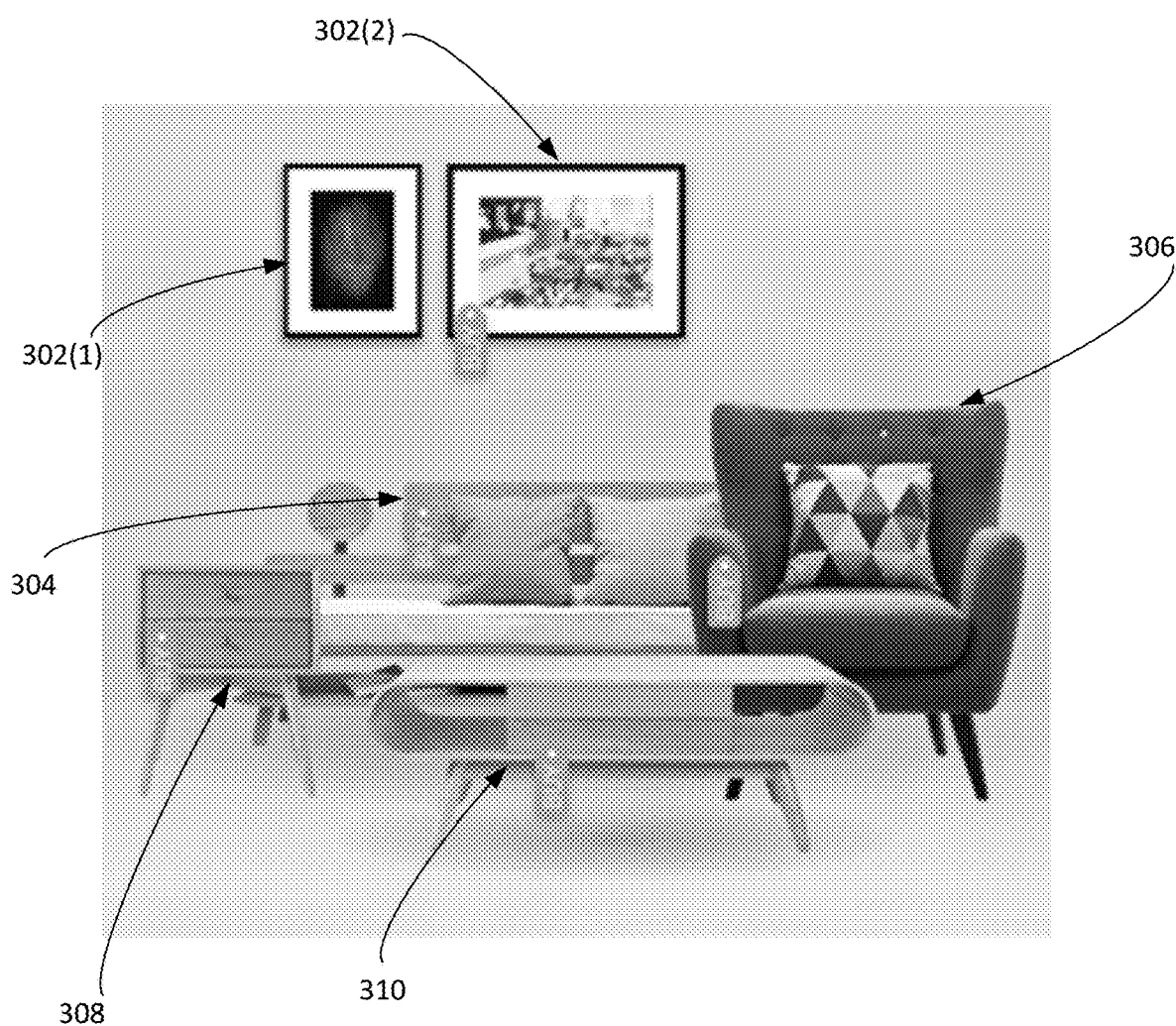
FIG. 3 is a schematic diagram of a collocation rendering of an example embodiment of a method for generating a collocation rendering according to the present disclosure.

For the to-be-collocated transaction objects in Table 1, it may be determined according to spatial position attributes of the transaction objects and a pre-generated collocation rule set that the sofa and the tea table are placed oppositely and arranged in a central ground area of the collocation template, the decorative painting is hung on the wall surface, and so on, and image information of an actual collocation rendering may be generated for the mutually collocated transaction objects according to the information. Referring to FIG. 3, a schematic diagram of a collocation rendering of an example embodiment of a method for generating a collocation rendering according to the present disclosure is shown.

It should be noted that in order to generate a relatively real collocation rendering, pictures of the to-be-collocated transaction objects are usually consistent with scales of real objects, that is, scales between pictures of different transaction objects are the same as those between real objects of the different transaction objects.

2) The preset collocation template includes layout modes of transaction objects of a preset class.

As the preset collocation template includes layout modes of transaction objects of a preset class, it is necessary to fill images into the collocation template according to category attributes of the transaction objects, so as to generate image information of the collocation rendering.

Figure 2:
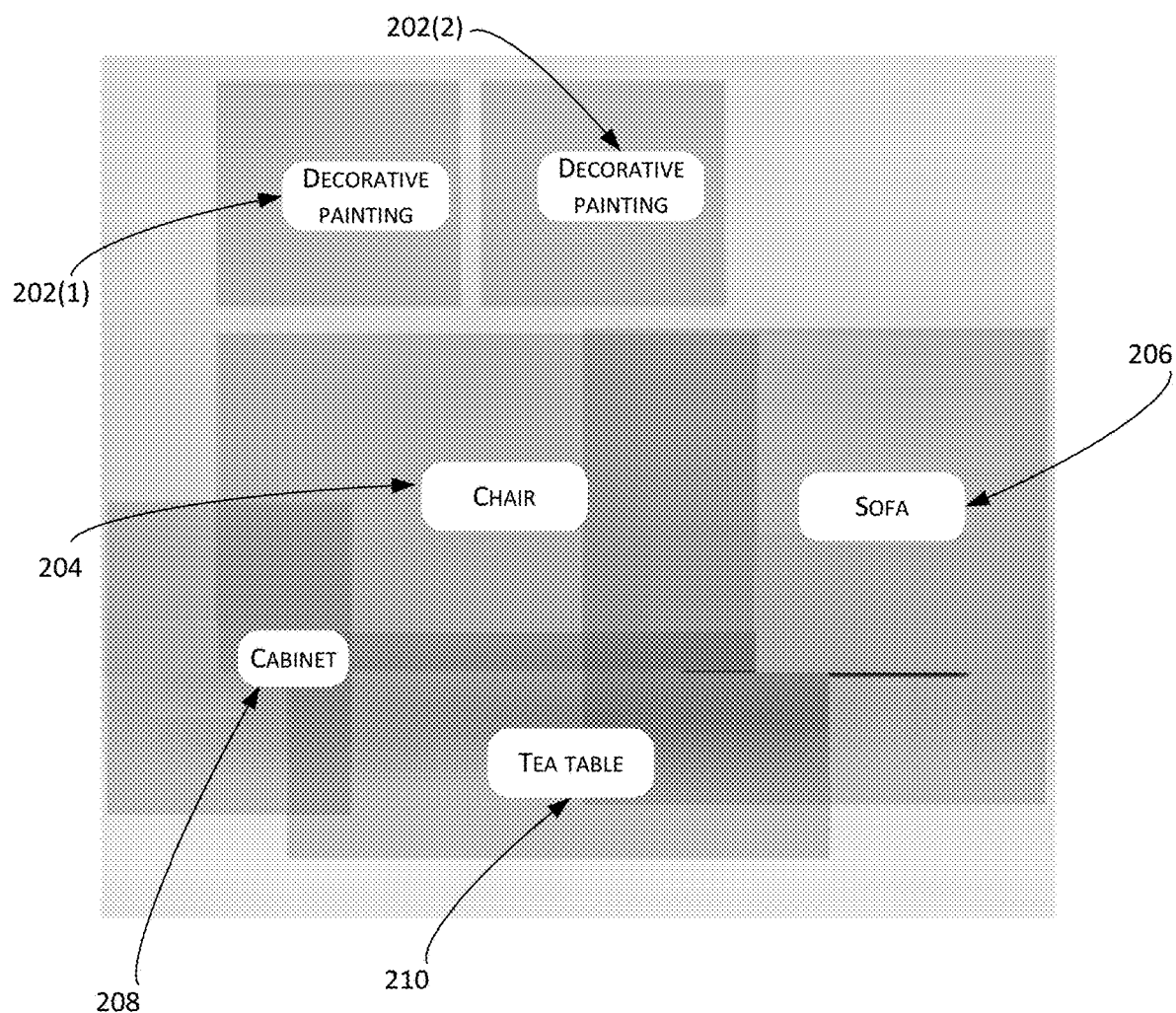
FIG. 2 is a schematic diagram of a collocation template of an example embodiment of a method for generating a collocation rendering according to the present disclosure.

Referring to FIG. 2, a schematic diagram of a collocation template of an example embodiment of a method for generating a collocation rendering according to the present disclosure is shown. As shown from FIG. 2, the collocation template defines categories of transaction objects included in the collocation rendering, as well as image layer identifiers, image layer positions and image layer sizes of image layers where the transaction objects of the categories are located. FIG. 2 shows the class of transaction objects including decorative painting 202(1), decorative painting 202(1), chair 204, sofa 206, cabinet 208, and tea table 210.

In this example embodiment, the step of generating image information of a collocation rendering of the to-be-collocated transaction objects includes the following steps: 2.1) filling, according to the category attributes of the to-be-collocated transaction objects, images of the to-be-collocated transaction objects into corresponding spatial positions of the preset collocation template; and 2.2) generating image information of the collocation rendering according to the preset collocation template into which the images have been filled.

By taking the collocation template shown in FIG. 2 as an example, the list of to-be-collocated transaction objects is still transaction objects shown in the above Table 1. The above steps 2.1 and 2.2 may be, for example, implemented as follows: it may be determined according to the category attributes of the transaction objects that the sofa is placed in a spatial position where a preset sofa category of the collocation template is located, the tea table is placed in a spatial position where a preset tea table category of the collocation template is located, the decorative painting is placed in a spatial position where a preset decorative painting category is located, and so on, and image information of an actual collocation rendering may be generated for the mutually collocated transaction objects according to the information.

Referring to FIG. 3, a schematic diagram of a collocation rendering of an example embodiment of a method for generating a collocation rendering according to the present disclosure is shown. For example, 302(1) corresponds to 202(1) and shows a transaction object of the decorative painting. 302(2) corresponds to 202(2) and shows another transaction object of the decorative painting. 304 corresponds to 204 and shows a transaction object of the chair. 306 corresponds to 206 and shows a transaction object of the sofa. 308 corresponds to 208 and shows a transaction object of the cabinet. 310 corresponds to 210 and shows a transaction object of the tea table.

Two available manners of generating a collocation rendering are described above. It should be noted that the collocation template and the collocation rendering may also be generated in other forms, and various forms of changes in the manners of generating the collocation template and the collocation rendering are only changes in specific implementation manners, do not depart from the core of the present disclosure, and thus fall within the protection scope of the present disclosure.

In an example implementation manner, in order to acquire layout information of the collocation rendering, the step of filling images of the to-be-collocated transaction objects into corresponding spatial positions of the preset collocation template may be implemented in the following manner: filling the images of the to-be-collocated transaction objects into different image layers of the preset collocation template. As images of different transaction objects are located in different image layers, the corresponding relation, that is, the layout information of the collocation rendering, may be extracted according to the collocation template into which the images have been filled.

In an example implementation manner, the step of generating image information of the collocation rendering according to the preset collocation template into which the images have been filled may include the following steps: 1) extracting a corresponding relation between the images and layout modes of the images from the preset collocation template into which the images have been filled; and 2) using the extracted corresponding relation as the layout information of the collocation rendering.

As a preferred implementation manner, in order to create a more visually real (three-dimensional) collocation rendering, there may be an overlapping relation between different image layers of the preset collocation template. For example, the image of the tea table may be partially overlapped above the image of the sofa, and so on.

In addition, the images of the to-be-collocated transaction objects may be static images and may also be dynamic images. The static images include images with transparent data, so as to create a more visually real collocation rendering, for example, images having a picture format of png24 and an alpha transparent channel, and so on. The dynamic images include dynamic images of items in a gif format, a flash animation format, a video form, etc. The collocation rendering may include a static image and a dynamic image at the same time, so as to enhance the effect of displaying the collocation rendering.

In an example implementation manner, if the list of to-be-collocated transaction objects and the preset collocation template in step S102 are acquired according to a collocation rendering displaying request, after the step of generating image information of a collocation rendering of the to-be-collocated transaction objects, the method further includes a step of returning the image information of the collocation rendering to the client terminal, so that the client terminal may display the collocation rendering according to the image information of the collocation rendering.

It should be noted that if the image information of the collocation rendering generated in step S104 is a picture of the collocation rendering, the picture of the collocation rendering is returned to the client terminal; if the image information of the collocation rendering generated in step S103 is layout information of the collocation rendering, the layout information of the collocation rendering is returned to the client terminal.

A method for generating a collocation rendering is provided in the above example embodiment. Corresponding to the method, the present disclosure further provides an apparatus for generating a collocation rendering. The apparatus corresponds to the example embodiment of the method.

Figure 4:
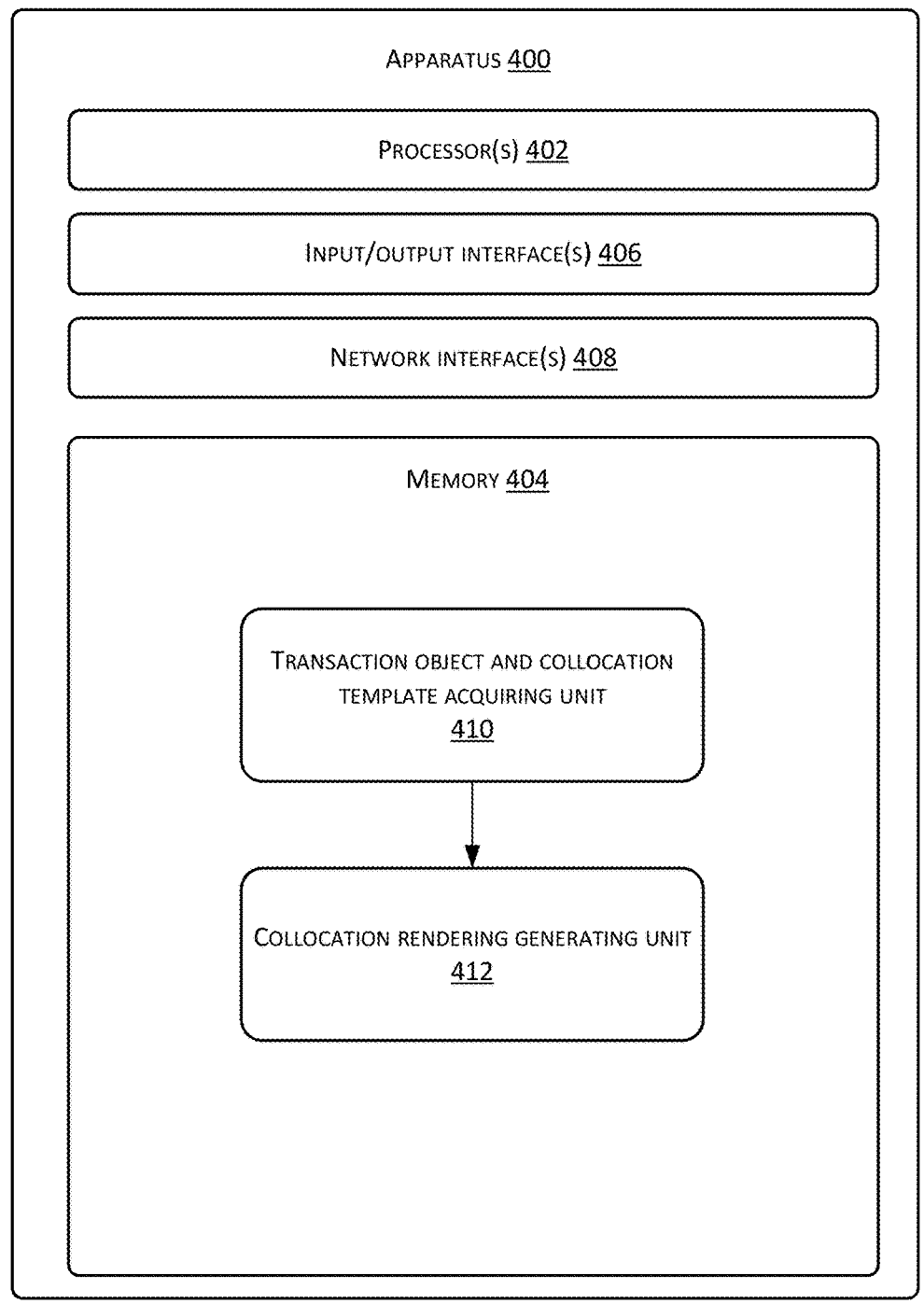
FIG. 4 is a schematic diagram of an example embodiment of an apparatus for generating a collocation rendering according to the present disclosure.

Referring to FIG. 4, a schematic diagram of an example embodiment of an apparatus 400 for generating a collocation rendering according to the present disclosure is shown. An apparatus example embodiment is described simply as it is basically similar to the process example embodiment; please refer to a part of the description of the process example embodiment for related content. The apparatus example embodiment described in the following is merely illustrative.

The apparatus 400 includes one or more processor(s) 402 or data processing unit(s) and memory 404. The apparatus 400 may further include one or more input/output interface(s) 406 and one or more network interface(s) 408. The memory is an example of the computer readable medium or media.

The memory 404 may store therein a plurality of modules or units including:

a transaction object and collocation template acquiring unit 410 configured to acquire a list of to-be-collocated transaction objects and acquire a preset collocation template; and a collocation rendering generating unit 412 configured to generate image information of a collocation rendering of the to-be-collocated transaction objects according to collocation attribute information of the to-be-collocated transaction objects and the preset collocation template.

Optionally, the collocation attribute information includes spatial position attributes, and the preset collocation template includes spatial position information; and the collocation rendering generating unit 412 includes:

a filling subunit configured to fill, according to the spatial position attributes of the to-be-collocated transaction objects and a pre-generated collocation rule set, images of the to-be-collocated transaction objects into corresponding spatial positions of the preset collocation template; and a generating subunit configured to generate image information of the collocation rendering according to the preset collocation template into which the images have been filled.

Optionally, the collocation attribute information includes category attributes, and the preset collocation template includes layout modes of transaction objects of a preset class; and the collocation rendering generating unit 412 includes:

a filling subunit configured to fill, according to the category attributes of the to-be-collocated transaction objects, images of the to-be-collocated transaction objects into corresponding spatial positions of the preset collocation template; and a generating subunit configured to generate image information of the collocation rendering according to the preset collocation template into which the images have been filled.

Optionally, the filling subunit is configured to fill the images of the to-be-collocated transaction objects into different image layers of the preset collocation template.

Optionally, the image information of the collocation rendering includes layout information of the collocation rendering; and the generating subunit includes:

an extracting subunit configured to extract a corresponding relation between the images and layout modes of the images from the preset collocation template into which the images have been filled; and a setting subunit configured to use the extracted corresponding relation as the layout information of the collocation rendering.

Optionally, the transaction object and collocation template acquiring unit 410 includes:

a receiving subunit configured to receive a collocation rendering displaying request which is sent by a client terminal and corresponding to the list of to-be-collocated transaction objects and the preset collocation template; and an extracting subunit configured to acquire the list of to-be-collocated transaction objects and the preset collocation template according to the collocation rendering displaying request.

Figure 5:
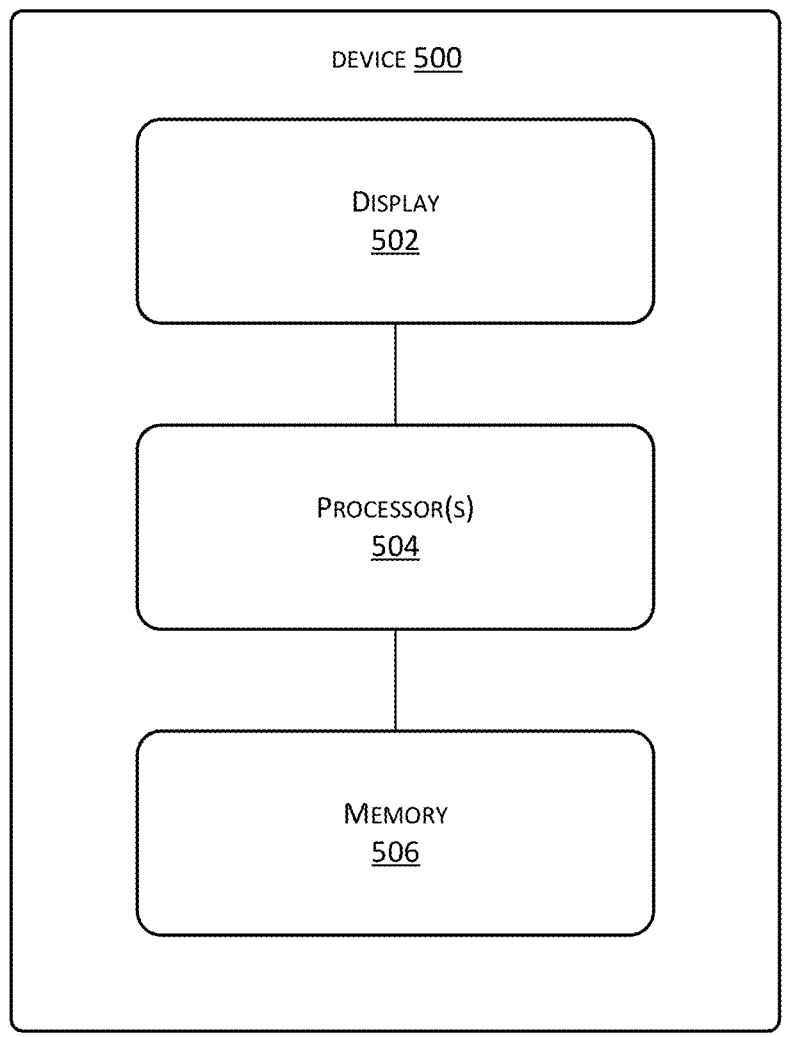
FIG. 5 is a schematic diagram of an electronic device according to the present disclosure.

Referring to FIG. 5, a schematic diagram of an electronic device according to the present disclosure is shown. A device example embodiment is described simply as it is basically similar to the process example embodiment; please refer to a part of the description of the process example embodiment for related content. The device example embodiment described in the following is merely illustrative.

In FIG. 5, a device 500 includes: a display 502; one or more processor(s) 504; and memory 5065 configured to store a program of a method for generating a collocation rendering. After being powered on and running the program of the method for generating a collocation rendering, the device performs the following steps: acquiring a list of to-be-collocated transaction objects and acquiring a preset collocation template; and generating image information of a collocation rendering of the to-be-collocated transaction objects according to collocation attribute information of the to-be-collocated transaction objects and the preset collocation template.

Corresponding to the above method for generating a collocation rendering, the present disclosure further provides a method for displaying a collocation rendering.

Figure 6:
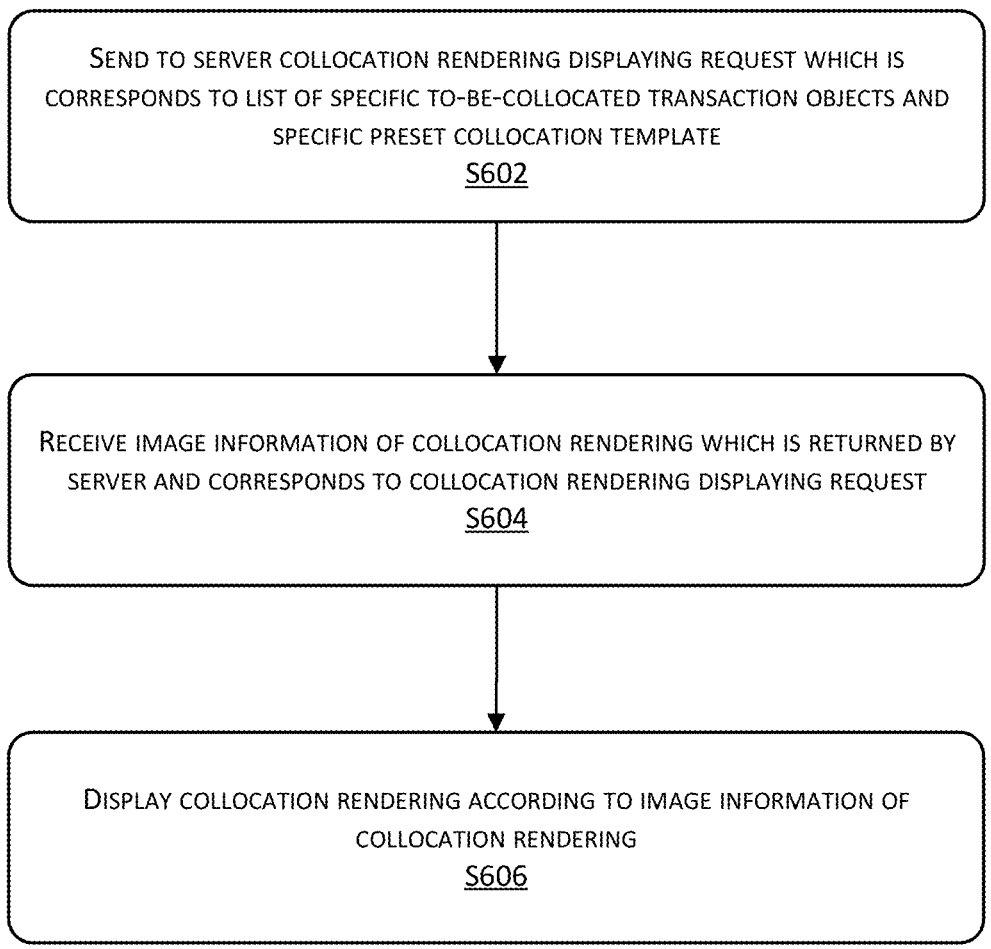
FIG. 6 is a flowchart of an example embodiment of a method for displaying a collocation rendering according to the present disclosure.

Referring to FIG. 6, a flowchart of an example embodiment of a method for displaying a collocation rendering according to the present disclosure is shown. The same contents between this example embodiment and the first example embodiment are not repeated here, and reference may be made to the corresponding part in the first example embodiment. The method for displaying a collocation rendering according to the present disclosure includes the following steps:

Step S602: A collocation rendering displaying request corresponding to a list of specific to-be-collocated transaction objects and a specific preset collocation template is sent to a server.

The method for displaying a collocation rendering provided in this example embodiment of the present disclosure is performed by a client terminal that needs to display a collocation rendering of a list of specific to-be-collocated transaction objects. The client terminal includes, but is not limited to, a mobile smart device, that is, a so-called mobile phone or smart phone, a PAD, an iPad, and so on, and further includes a personal computer and another terminal device.

In an example implementation manner, the collocation rendering displaying request may include object identifiers of the to-be-collocated transaction objects in the list of specific to-be-collocated transaction objects and a template identifier of the specific preset collocation template. The server may acquire a list of to-be-collocated transaction objects and a preset collocation template according to the object identifiers of the to-be-collocated transaction objects and the template identifier of the collocation template and generate image information of a collocation rendering of the to-be-collocated transaction objects according to collocation attribute information of the to-be-collocated transaction objects and the specific preset collocation template.

Step S604: Image information of the collocation rendering which is returned by the server and corresponding to the collocation rendering displaying request is received.

The image information of the collocation rendering refers to a representation manner of the collocation rendering, including a picture of the collocation rendering or layout information of the collocation rendering. The layout information of the collocation rendering refers to data based on which the picture of the collocation rendering is formed. For example, the layout information of the collocation rendering includes a corresponding relation between images of the transaction objects and layout modes of the images of the transaction objects in the collocation rendering.

The layout mode includes an image layer identifier, an image layer position and an image layer size of an image layer, in the collocation rendering, where an image is located.

If the image information of the collocation rendering generated by the server is a picture of the collocation rendering, the picture of the collocation rendering is returned to the client terminal. If the image information of the collocation rendering generated by the server is layout information of the collocation rendering, the layout information of the collocation rendering is returned to the client terminal.

Step S606: The collocation rendering is displayed according to the image information of the collocation rendering.

After the image information of the collocation rendering is acquired, a collocation rendering of the to-be-collocated transaction objects in the list of specific to-be-collocated transaction objects may be displayed according to the image information, so that the user may view a final rendering effect of collocating the to-be-collocated transaction objects.

In an example implementation manner, if the image information of the collocation rendering is a picture of the collocation rendering, the collocation rendering may be seen by directly displaying the picture. If the image information of the collocation rendering is layout information of the collocation rendering and if the layout information of the collocation rendering is a corresponding relation between the images of the transaction objects and layout modes of the images of the transaction objects in the collocation rendering, the collocation rendering is displayed in the following manner: displaying the collocation rendering according to the corresponding relation.

For example, the step of displaying the collocation rendering according to the corresponding relation may include the following steps: 1) acquiring layout modes of the images of the to-be-collocated transaction objects in the specific collocation rendering according to the corresponding relation; and 2) displaying the images of the to-be-collocated transaction objects in an image container according to the layout modes corresponding to the images of the to-be-collocated transaction objects.

The image container refers to an image container that may accommodate a plurality of image layers. Image layer identifiers of different image layers in the image container depend on an order of generating the image layers, and there may be an overlapping relation between different image layers displayed.

The step of displaying the images of the to-be-collocated transaction objects in an image container may be implemented in the following manner: displaying the images of the to-be-collocated transaction objects in the image container sequentially by taking an ascending order of the image layer identifiers as an image display order. In such an implementation manner, an image with a corresponding low image layer identifier is displayed in the bottom layer of the entire collocation rendering, while an image with a corresponding high image layer identifier is displayed in the top layer of the entire collocation rendering.

If the collocation rendering has a background image, before the step of displaying the images of the to-be-collocated transaction objects, the method further includes a step of displaying, in the image container, the background picture included in the collocation rendering.

After viewing the collocation rendering, the user may need to switch to a list page of the transaction objects for viewing. If the image information of the collocation rendering is the layout information, after the collocation rendering is displayed, the method may further include the following steps: 1) receiving a list page display instruction sent by a user; and 2) displaying a list page of the to-be-collocated transaction objects in a preset list manner according to the layout information of the collocation rendering.

1) A list page display instruction sent by a user is received.

The manner of sending the list page display instruction includes, but is not limited to, a trigger manner of single-clicking the collocation rendering and a trigger manner of double-clicking the collocation rendering. The instruction may also be sent through a preset gesture, such as a pinching gesture or a 3D touch gesture.

Further, it is also possible to distinguish different gestures to determine whether to switch to a list page directly or in a dynamic-effect manner.

2) A list page of the to-be-collocated transaction objects is displayed in a preset list manner according to the layout information of the collocation rendering.

The preset list manner includes, but is not limited to, an ascending manner or a descending manner of image layer identifiers of the image layers corresponding to the images of the to-be-collocated transaction objects. Alternatively, the images of the to-be-collocated transaction objects may also be arranged randomly without considering the image layer identifiers. For example, the images of the list page may be arranged in a style such as a nine-grid pattern.

In an example implementation manner, after the step of receiving a list page display instruction sent by a user and before the step of displaying the images of the to-be-collocated transaction objects in a preset list manner, the method may further include a step of determining whether an image layer currently displayed is an image layer including the collocation rendering. If the image layer currently displayed is an image layer including the collocation rendering, the step of displaying the images of the to-be-collocated transaction objects in a preset list manner may be performed. Otherwise, as the layout information of the collocation rendering cannot be acquired, a list of images of the to-be-collocated transaction objects cannot be acquired, and thus a list page cannot be generated.

In an example implementation manner, the step of displaying a list page of the to-be-collocated transaction objects in a preset list manner may include the following steps: 2.1) acquiring images of the to-be-collocated transaction objects according to the layout information of the collocation rendering; 2.2) establishing a list page image layer, and arranging the images of the to-be-collocated transaction objects on the list page image layer in the preset list manner; and 2.3) displaying the list page image layer.

The step of displaying the list page image layer may employ the following manner: stacking the list page image layer above the image layers of the collocation rendering. A specific manner of stacking the list page image layer above the image layers of the collocation rendering may be complete overlapping or partial overlapping. The size of the list page image layer may be the same as or different from that of the image layers of the collocation rendering.

It should be noted that the list page image layer stacked above the image layers of the collocation rendering is actually a capture layer located above the image layers of the collocation rendering. In an example implementation manner, the list page image layer may be set as a white image layer having a certain transparency. When the list page image layer having a certain transparency is stacked above the image layers of the collocation rendering, the user may vaguely view the collocation rendering; therefore, the visual experience of the user may be improved.

In the above manner of switching from the collocation rendering to a list page, page jump is not needed in the process of switching between two display manners, thus achieving an effect of saving the network traffic and improving the browsing efficiency.

After the step of displaying the images of the to-be-collocated transaction objects in a preset list manner, the method for displaying a collocation rendering provided in the example embodiment of the present disclosure may further include the following steps: 1) receiving an instruction of displaying the collocation rendering sent by a user; and 2) closing the list page.

The manner of sending the instruction of displaying the collocation rendering includes, but is not limited to, a trigger manner of single-clicking the list page and a trigger manner of double-clicking the list page. The instruction may also be sent through a preset gesture, such as a pinching gesture or a 3D touch gesture.

In an example implementation manner, after the step of receiving an instruction of displaying the collocation rendering sent by a user and before the step of closing the list page of items, the method may further include a step of determining whether an image currently displayed is an image layer including the list page. If the image layer currently displayed is an image layer including the list page, the list page may be closed. After the list page is closed, the collocation rendering may be seen by the user again.

A method for displaying a collocation rendering is provided in the above example embodiment. Corresponding to the method, the present disclosure further provides an apparatus for displaying a collocation rendering. The apparatus corresponds to the example embodiment of the method.

Figure 7:
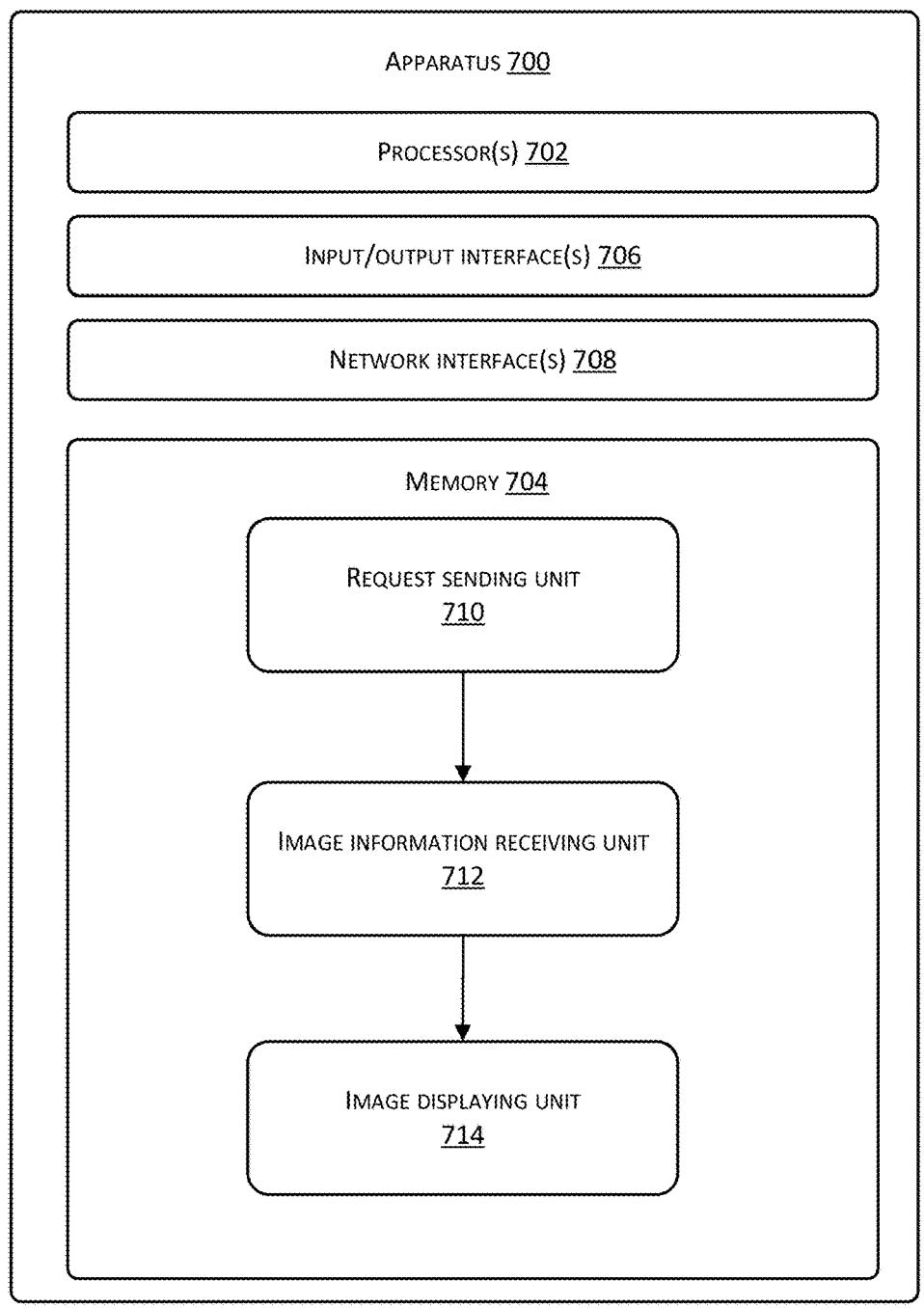
FIG. 7 is a schematic diagram of an example embodiment of an apparatus for displaying a collocation rendering according to the present disclosure.

Referring to FIG. 7, a schematic diagram of an example embodiment of an apparatus 700 for displaying a collocation rendering according to the present disclosure is shown. An apparatus example embodiment is described simply as it is basically similar to the process example embodiment; please refer to a part of the description of the process example embodiment for related content. The apparatus example embodiment described in the following is merely illustrative.

The apparatus 700 includes one or more processor(s) 702 or data processing unit(s) and memory 704. The apparatus 700 may further include one or more input/output interface(s) 706 and one or more network interface(s) 708. The memory is an example of the computer readable medium or media.

The memory 704 may store therein a plurality of modules or units including:

a request sending unit 710 configured to send, to a server, a collocation rendering displaying request corresponding to a list of specific to-be-collocated transaction objects and a specific preset collocation template;

an image information receiving unit 712 configured to receive image information of a collocation rendering which is returned by the server and corresponding to the collocation rendering displaying request; and an image displaying unit 714 configured to display the collocation rendering according to the image information of the collocation rendering.

Optionally, the image information of the collocation rendering includes a picture of the collocation rendering or layout information of the collocation rendering;

the layout information of the collocation rendering includes a corresponding relation between images of the to-be-collocated transaction objects and layout modes of the images of the to-be-collocated transaction objects in the collocation rendering;

the image displaying unit 714 is configured to display the collocation rendering according to the corresponding relation; and the image displaying unit 714 includes the following units (not shown in FIG. 7):

an acquiring subunit configured to acquire layout modes of the images of the to-be-collocated transaction objects in the collocation rendering according to the corresponding relation, the layout mode including an image layer identifier, an image layer position and an image layer size of an image layer, in the collocation rendering, where an image of a to-be-collocated transaction object is located; and a first display subunit configured to display the images of the to-be-collocated transaction objects in an image container according to the layout modes corresponding to the images of the to-be-collocated transaction objects.

Optionally, the image information of the collocation rendering includes a picture of the collocation rendering or layout information of the collocation rendering; and the apparatus 700 further includes the following modules or units (not shown in FIG. 7) stored in the memory 704:

a first instruction receiving unit configured to receive a list page display instruction sent by a user; and a list page display unit configured to display a list page of the to-be-collocated transaction objects in a preset list manner according to the layout information of the collocation rendering.

Optionally, the list page display unit includes:

an acquiring subunit configured to acquire images of the to-be-collocated transaction objects according to the layout information of the collocation rendering;

an arranging subunit configured to establish a list page image layer, and arrange the images of the to-be-collocated transaction objects on the list page image layer in the preset list manner; and a display subunit configured to display the list page image layer.

Optionally, the display subunit is configured to stack the list page image layer above the image layers of the collocation rendering.

Optionally, the apparatus 700 further includes the following modules or units (not shown in FIG. 7) stored in the memory 704:

a second instruction receiving unit configured to receive an instruction of displaying a collocation rendering sent by a user; and a list page closing unit configured to close the list page.

Figure 8:
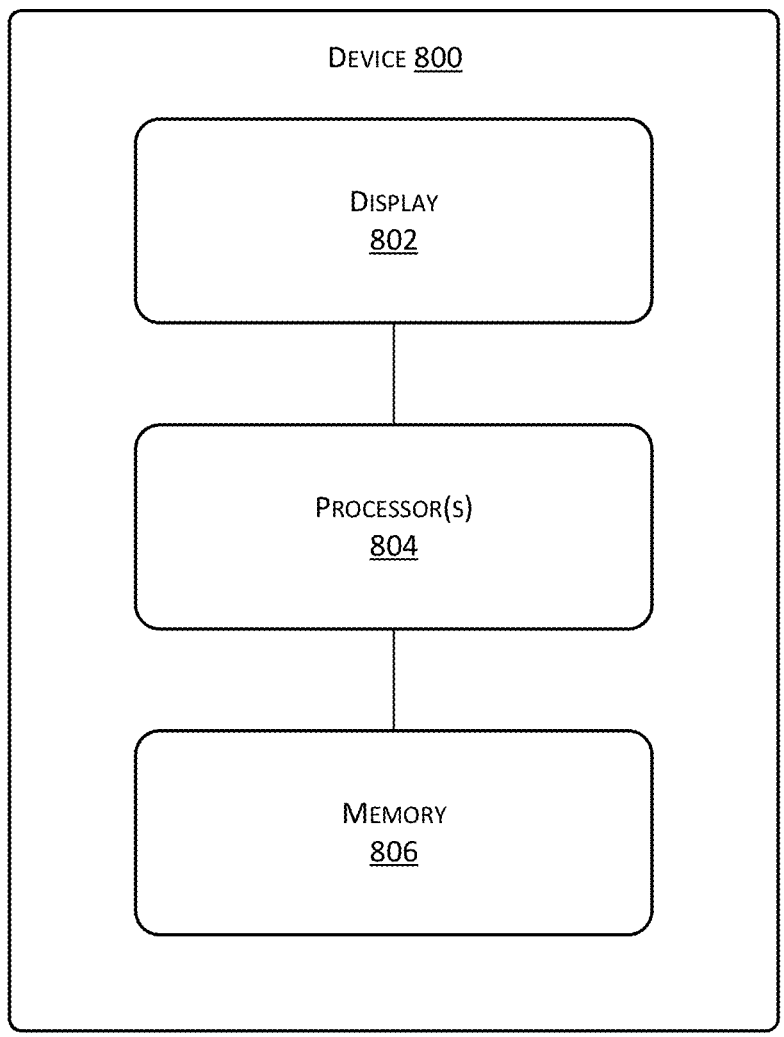
FIG. 8 is a schematic diagram of another electronic device according to the present disclosure.

Referring to FIG. 8, a schematic diagram of another electronic device according to the present disclosure is shown. A device example embodiment is described simply as it is basically similar to the process example embodiment; please refer to a part of the description of the process example embodiment for related content. The device example embodiment described in the following is merely illustrative.

In FIG. 8, a device 800 includes a display 802; one or more processor(s) 804; and memory 806 configured to store a program of a method for displaying a collocation rendering. After being powered on and running the program of the method for displaying a collocation rendering, the device performs the following steps: sending, to a server, a collocation rendering displaying request corresponding to a list of specific to-be-collocated transaction objects and a specific preset collocation template; receiving image information of a collocation rendering which is returned by the server and corresponding to the collocation rendering displaying request; and displaying the collocation rendering according to the image information of the collocation rendering.

Figure 9:
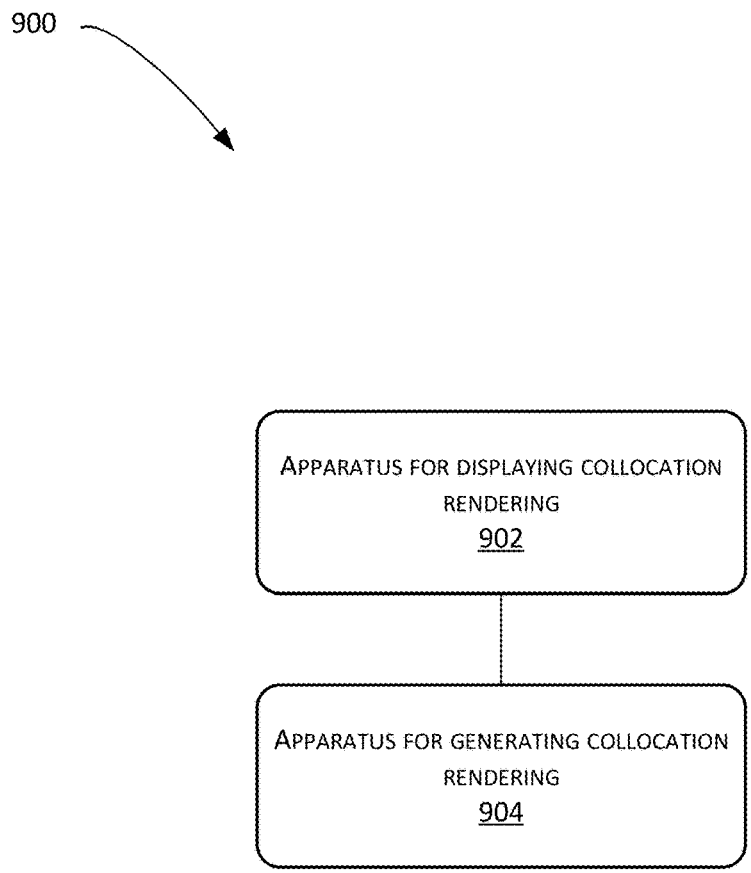
FIG. 9 is a schematic diagram of an example embodiment of a system for displaying a collocation rendering according to the present disclosure.

An example embodiment of the present disclosure further provides a system for displaying a collocation rendering. As shown in FIG. 9, a system 900 includes an apparatus 902 for displaying collocation rendering and an apparatus 904 for generating collocation rendering as described in the above example embodiments. The apparatus 902 for displaying collocation rendering is generally deployed in a terminal device such as a mobile communication device, a personal computer, a PAD, and an iPad. The apparatus 904 for generating collocation rendering is generally deployed in, but is not limited to, a server, and may also be deployed in any device that may implement the method for generating a collocation rendering. For example, the apparatus 902 for displaying collocation rendering is deployed on a smart phone, and may send, to a server, a collocation rendering displaying request corresponding to a list of specific to-be-collocated transaction objects and a specific preset collocation template. The apparatus 904 for generating collocation rendering is deployed on the server, receives the collocation rendering displaying request which is sent by a client terminal, acquires the list of specific to-be-collocated transaction objects and the specific preset collocation template according to the collocation rendering displaying request, generates image information of a collocation rendering of the to-be-collocated transaction objects according to collocation attribute information of the to-be-collocated transaction objects and the specific preset collocation template, and returns the image information to the client terminal. The apparatus 101 for displaying a collocation rendering displays the collocation rendering according to the image information after receiving the image information returned by the server.

According to the method, apparatus and system for generating a collocation rendering provided in the present disclosure, a list of to-be-collocated transaction objects is acquired, a preset collocation template is acquired, and image information of a collocation rendering of the to-be-collocated transaction objects is generated according to collocation attribute information of the to-be-collocated transaction objects and the preset collocation template. In such a processing manner, a plurality of transaction objects may be automatically combined and collocated into a scene, thus allowing a user to appreciate a rendering effect of collocating the plurality of transaction objects together.

Corresponding to the above method for generating a collocation rendering, the present disclosure further provides a method for generating a collocation rendering of items. First of all, the method for generating a collocation rendering of items in the conventional techniques and problems existing in the method are briefly described in the following.

At present, a collocation rendering of commodities generated on an e-commerce platform is generally a static collocation rendering, that is, a non-editable collocation rendering of commodities released in advance. The use of the static collocation rendering mainly has the following problem: the user cannot actively generate a collocation rendering instantly for commodities selected by the user by using a tool provided on the platform, that is, the user cannot generate a dynamic collocation rendering. A user cannot actively collocate a plurality of commodities together to view a real rendering effect of collocation in the conventional techniques, and the possibility of a buyer purchasing more commodities at a time is thus reduced. In summary, the conventional techniques has a problem that a plurality of commodities cannot be combined and collocated dynamically into a real scene.

Figure 10:
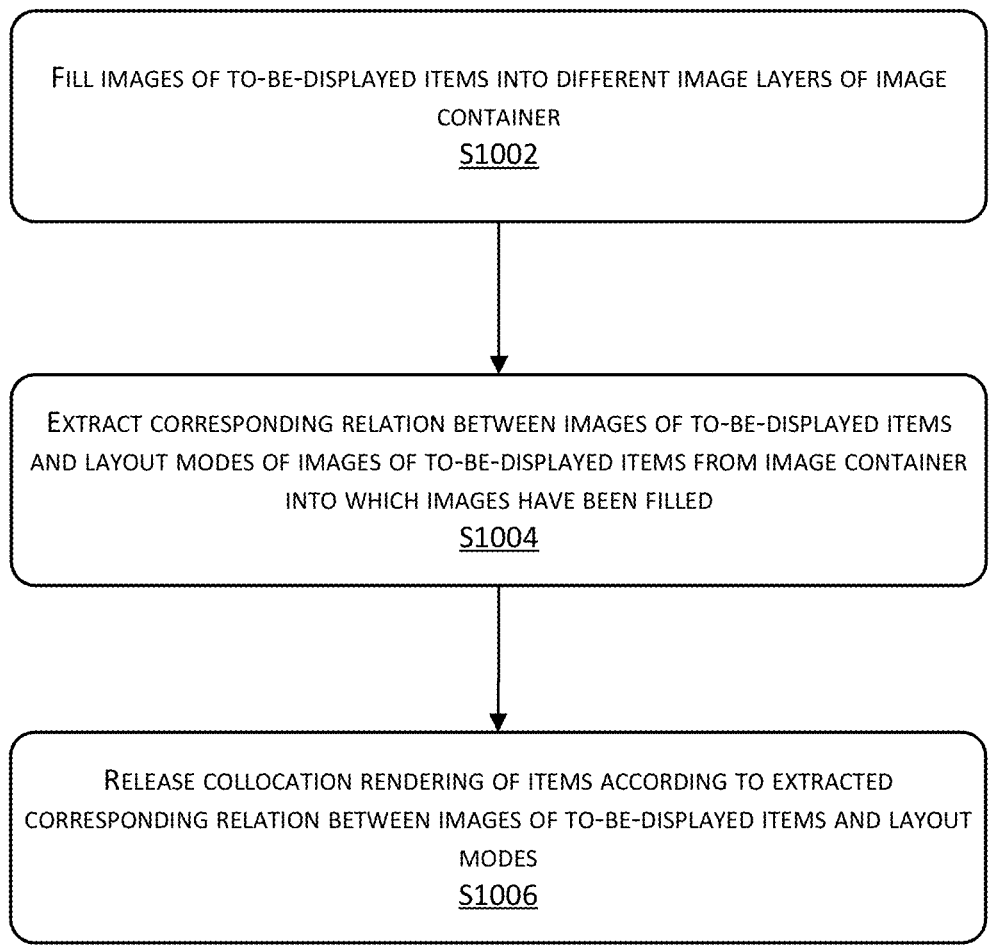
FIG. 10 is a flowchart of an example embodiment of a method for generating a collocation rendering of items according to the present disclosure.

Referring to FIG. 10, a flowchart of an example embodiment of a method for generating a collocation rendering of items according to the present disclosure is shown. The same contents between this example embodiment and the first example embodiment are not repeated here, and reference may be made to the corresponding part in the first example embodiment. The method for generating a collocation rendering of items according to the present disclosure includes the following steps:

Step S1002: Images of to-be-displayed items are filled into different image layers of an image container.

The to-be-displayed items include static images of the items or dynamic images of the items. The static images include image with transparent data, for example, item images having a picture format of png24 and an alpha transparent channel, and so on. The dynamic images include dynamic images of items in a gif format, a flash animation format, a video form, etc. The item images filled into the image container may include static images and dynamic images at the same time, so as to enhance the effect of displaying the collocation rendering.

The image container refers to an image container that may accommodate a plurality of image layers. Image layer identifiers of different image layers in the image container depend on an order of generating the image layers, and there may be an overlapping relation between different image layers displayed.

This step may be performed in many specific implementation manners, as long as the images of the to-be-displayed items may be filled into different image layers of the image container. Two optional image filling manners are provided in the following.

1) Random Filling Manner

For example, the filling manner is: filling the images of the to-be-displayed items in random positions of the image container one by one, images of different to-be-displayed items corresponding to different image layers.

When the images are filled in this filling manner, image layer identifiers of image layers where the images of the to-be-displayed items are located generally depend on a filling order of filling the images of the to-be-displayed items into the image container. In an example implementation manner, a tool for specifying image layer identifiers of image layers may also be provided for a maker of a rendering. The maker of a rendering may specify, by means of this tool, image layer identifiers of image layers where the images of the to-be-displayed items are located.

This filling manner has an advantage that the maker of a rendering may freely fill the images of the to-be-displayed items into random positions of the image container without any limitations.

2) Template Filling Manner

This filling manner includes the following steps: first of all, the maker of a rendering needs to select a required collocation template from a plurality of preset collocation templates and display the selected collocation template in the image container; and then fill the images of the to-be-displayed items into different image layers of the selected collocation template respectively.

The collocation template includes set image layers, as well as identifiers, positions and sizes of the image layers. That is, a basic layout mode of the collocation rendering of the items has been determined, and it is only necessary to fill the images of the to-be-displayed items into different image layers of the collocation template.

Two common image filling manners are provided above. It should be noted that all the above different manners are only changes in specific implementation manners, do not depart from the core of the present disclosure, and thus fall within the protection scope of the present disclosure.

Step S1004: A corresponding relation between the images of the to-be-displayed items and layout modes of the images of the to-be-displayed items is extracted from the image container into which the images have been filled.

The layout mode includes an image layer identifier, an image layer position and an image layer size of an image layer, in the image container, where an image of a to-be-displayed item is located.

After the images of the to-be-displayed items are filled into the image container through the previous step, in this step, a corresponding relation between the images of the to-be-displayed items and layout modes of the images of the to-be-displayed items is extracted from the image container into which the images have been filled, that is, an image layer identifier, an image layer position and an image layer size of an image layer, in the image container, where an image of each to-be-displayed item is located are extracted.

Different image filling manners correspond to different corresponding relation extraction manners. Corresponding relation extraction methods corresponding to the random filling manner and the template filling manner described in the previous step respectively will be provided below.

A corresponding relation extraction process corresponding to the random filling manner given in the previous step includes the following steps: 1) determining, according to a filling order of the images of the to-be-displayed items, image identifiers of the image layers where the images of the to-be-displayed items are located; 2) acquiring display positions and display sizes of the image layers in the image container; 3) forming layout modes of the image layers according to the image layer identifiers, the display positions and the display sizes of the image layers; and 4) forming the corresponding relation between the images of the to-be-displayed items and the layout modes according to the layout modes of the image layers and the images of the to-be-displayed items which have been filled in the image layers.

A corresponding relation extraction process corresponding to the template filling manner given in the previous step includes the following steps: 1) acquiring a layout mode of the preset collocation template, the layout mode of the preset collocation template including image layer identifiers, image layer positions and image layer sizes of image layers; and 2) forming the corresponding relation between the images of the to-be-displayed items and the layout modes according to the layout mode of the preset collocation template and the images of the to-be-displayed items which have been filled into the image layers.

Step S1006: A collocation rendering of the items is released according to the extracted corresponding relation between the images of the to-be-displayed items and the layout modes.

The collocation rendering of the items generated (released) by using the method for generating a collocation rendering of items provided in the present disclosure is not a conventional static picture, but a dynamic picture represented by the corresponding relation between the images of the to-be-displayed items and the layout modes of the images of the to-be-displayed items. Therefore, the corresponding relation between the images of the to-be-displayed items and the layout modes, which is extracted from the collocation rendering of the items, is actually released when the collocation rendering of the items is released.

In an example implementation manner, a background picture may also be configured for an established collocation rendering of items so as to obtain a better rendering effect of image collocation. Therefore, before the step of releasing the collocation rendering of the items, the method further includes a step of filling the background picture of the collocation rendering of the items into a background image layer of the image container.

It should be noted that there may be an overlapping relation between different image layers displayed. Item images are overlapped on a background image, and the background image is located on the bottommost image layer. Therefore, an image layer identifier corresponding to the background image layer is the minimum image layer identifier. The image layer identifiers corresponding to the images of the to-be-displayed items are numbered 2 to n sequentially from bottom up according to a filling order of the images of the items, that is, the $n^{th}$ filled item image is at the top layer of the image container.

In addition, the collocation rendering of the items generated by using the method provided in the present disclosure is a dynamic collocation rendering of the items. Therefore, the released dynamic collocation rendering of the items are also editable, for example, image layer identifiers, sizes and positions of different image layers may be adjusted, and so on. A new image of a to-be-displayed item may also be added. An updated corresponding relation between images of the to-be-displayed items and layout modes, which is extracted from the edited collocation rendering of the items, is actually released when the edited collocation rendering of the items is released.

The above example embodiment provides a method for generating a collocation rendering of items. Corresponding to the method, the present disclosure further provides an apparatus for generating a collocation rendering of items. The apparatus corresponds to the example embodiment of the method.

Figure 11:
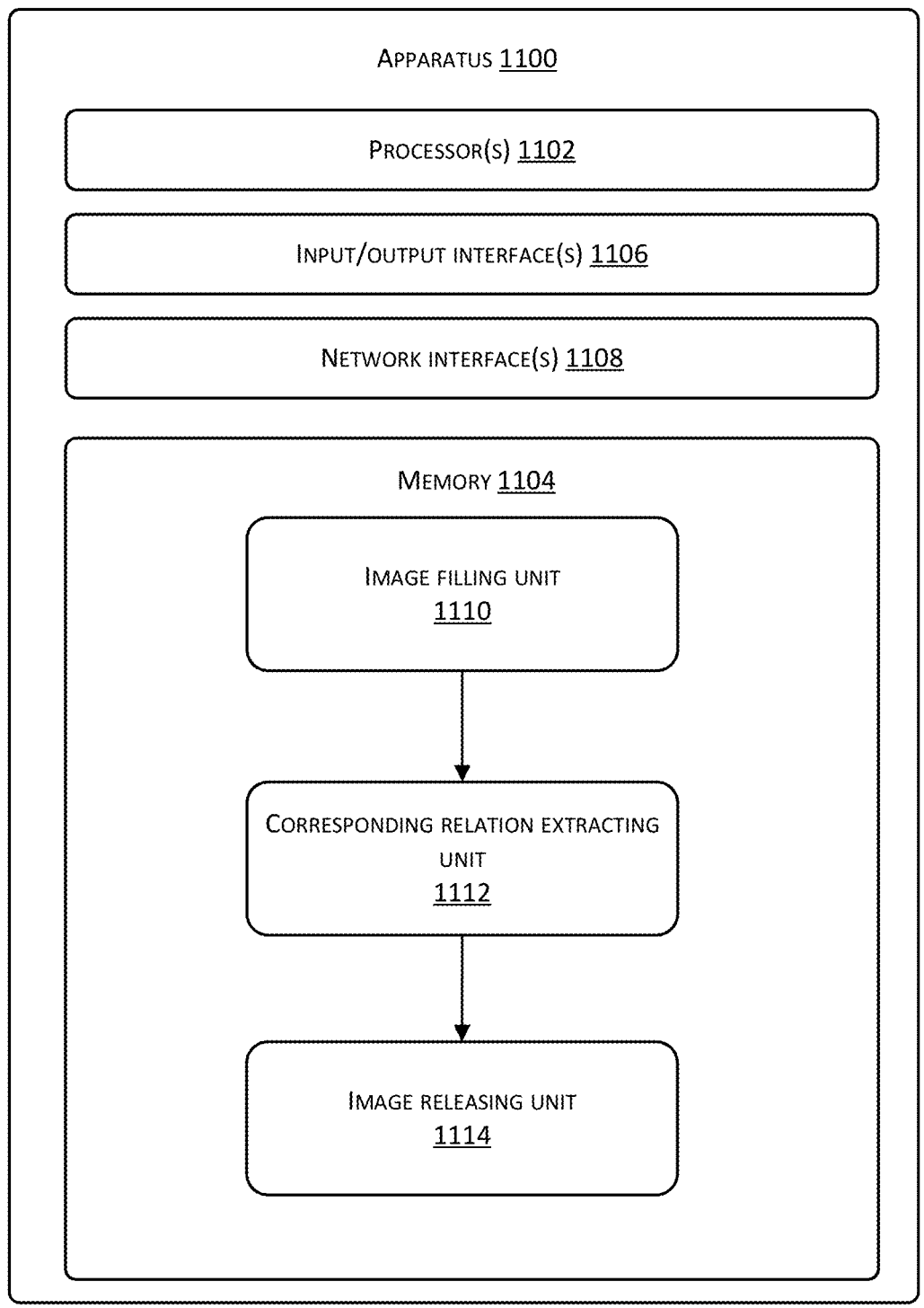
FIG. 11 is a schematic diagram of an example embodiment of an apparatus for generating a collocation rendering of items according to the present disclosure.

Referring to FIG. 11, a schematic diagram of an example embodiment of an apparatus 1100 for generating a collocation rendering of items according to the present disclosure is shown. An apparatus example embodiment is described simply as it is basically similar to the process example embodiment; please refer to a part of the description of the process example embodiment for related content. The apparatus example embodiment described in the following is merely illustrative.

In FIG. 11, the apparatus 1100 includes one or more processor(s) 1102 or data processing unit(s) and memory 1104. The apparatus 1100 may further include one or more input/output interface(s) 1106 and one or more network interface(s) 1108. The memory is an example of the computer readable medium or media.

The memory 1104 may store therein a plurality of modules or units including:

an image filling unit 1110 configured to fill images of to-be-displayed items into different image layers of an image container;

a corresponding relation extracting unit 1112 configured to extract a corresponding relation between the images of the to-be-displayed items and layout modes of the images of the to-be-displayed items from the image container into which the images have been filled, the layout mode including an image layer identifier, an image layer position and an image layer size of an image layer, in the image container, where an image of a to-be-displayed item is located; and an image release unit 1114 configured to release a collocation rendering of the items according to the extracted corresponding relation between the images of the to-be-displayed items and the layout modes.

Figure 12:
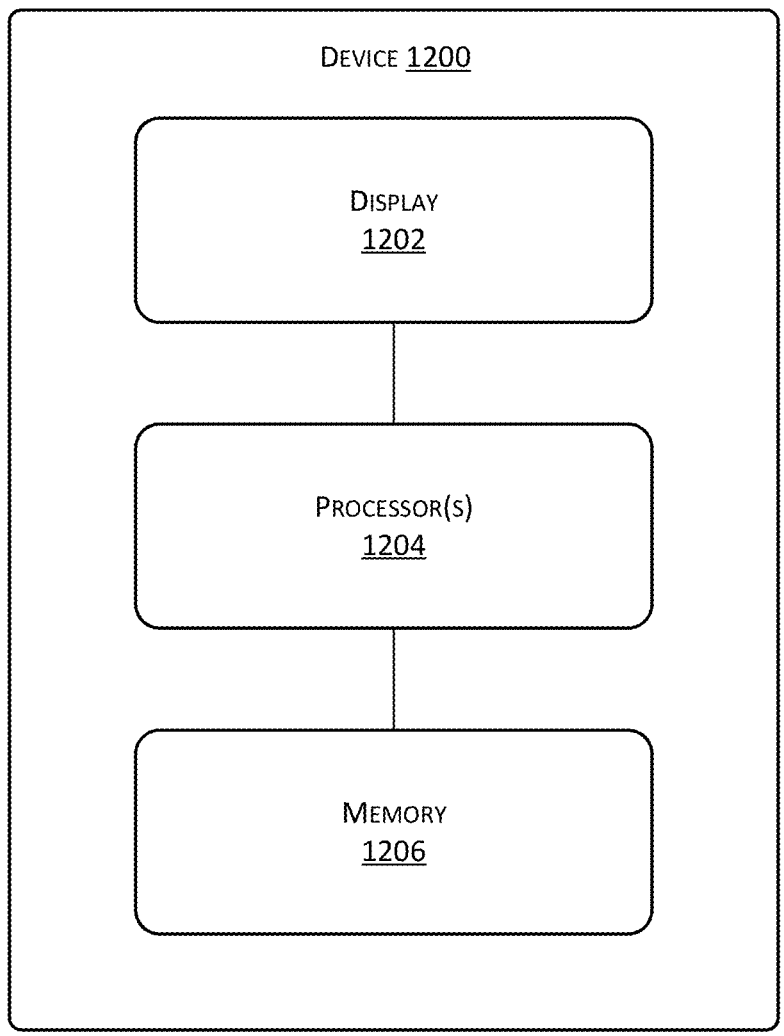
FIG. 12 is a schematic diagram of an example embodiment of still another electronic device according to the present disclosure.

Referring to FIG. 12, a schematic diagram of an example embodiment of an electronic device according to the present disclosure is shown. A device example embodiment is described simply as it is basically similar to the process example embodiment; please refer to a part of the description of the process example embodiment for related content. The device example embodiment described in the following is merely illustrative.

In FIG. 12, a device 1200 includes a display 1202, one or more processor(s) 1204, and memory 1206 configured to store a program of a method for generating a collocation rendering of items. After being powered on and running the program generating the method for generating a collocation rendering, the device performs the following steps: filling images of to-be-displayed items into different image layers of an image container; extracting a corresponding relation between the images of the to-be-displayed items and layout modes of the images of the to-be-displayed items from the image container into which the images have been filled, the layout mode including an image layer identifier, an image layer position and an image layer size of an image layer, in the image container, where an image of a to-be-displayed item is located; and releasing a collocation rendering of the items according to the extracted corresponding relation between the images of the to-be-displayed items and the layout modes.

According to the method, apparatus and electronic device for generating a collocation rendering of items provided in the present disclosure, images of to-be-displayed items are filled into different image layers of an image container, and a collocation rendering of the items is released according to a corresponding relation between the images of the to-be-displayed items and layout modes of the images of the to-be-displayed items in the image container. In such a processing manner, a user may combine and collocate a plurality of commodities dynamically into a scene, thus allowing the user able to appreciate a rendering effect of collocating the plurality of transaction objects together.

Corresponding to the above method for generating a collocation rendering of items, the present disclosure further provides a method for displaying a collocation rendering of items. The method for displaying a collocation rendering of items provided in the present disclosure may be applied to a mobile smart device, that is, a so-called mobile phone or smart phone, a PAD, an iPad, and so on, and may also be applied to a personal computer and another terminal device.

Figure 13:
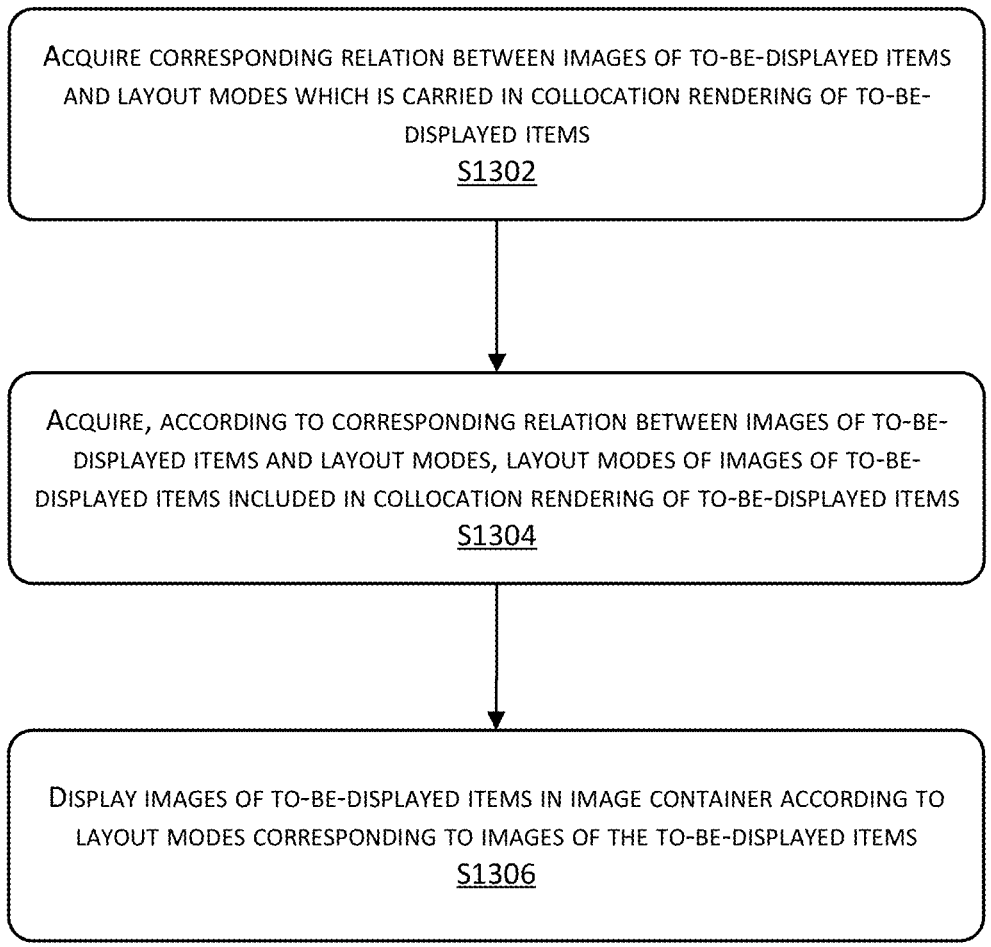
FIG. 13 is a flowchart of an example embodiment of a method for displaying a collocation rendering of items according to the present disclosure.

Referring to FIG. 13, a flowchart of an example embodiment of a method for displaying a collocation rendering of items according to the present disclosure is shown. The same contents between this example embodiment and the first example embodiment are not repeated here, and reference may be made to the corresponding part in the first example embodiment. The method for displaying a collocation rendering of items according to the present disclosure includes the following steps:

Step S1302: A corresponding relation between images of to-be-displayed items and layout modes which is carried in a collocation rendering of the to-be-displayed items is acquired.

By using the method for generating a collocation rendering of items provided in the present disclosure, after a collocation rendering of items is established and released, the rendering further needs to be displayed by using the method for displaying a collocation rendering of items provided in the present disclosure, so as to allow users to view.

The collocation rendering of items released by applying the method for generating a collocation rendering of items provided in the present disclosure is a dynamic picture represented by a corresponding relation between images of to-be-displayed items and layout modes of the images of the to-be-displayed items; therefore, the corresponding relation between the images of the to-be-displayed items and the layout modes, which is extracted from the collocation rendering of the items, is acquired first when the collocation rendering of the items is displayed.

Step S1304: Layout modes of the images of the to-be-displayed items included in the collocation rendering of the to-be-displayed items are acquired according to the corresponding relation between the images of the to-be-displayed items and the layout modes.

Images of the to-be-displayed items and layout modes of the images of the to-be-displayed items in the collocation rendering of the items may be extracted from the acquired a corresponding relation between the images of the to-be-displayed items and the layout modes. The layout mode includes an image layer identifier, an image layer position and an image layer size of an image layer, in the collocation rendering of the to-be-displayed items, where an image of a to-be-displayed item is located.

Step S1306: The images of the to-be-displayed items are displayed in an image container according to the layout modes corresponding to the images of the to-be-displayed items.

After the layout modes of the images of the to-be-displayed items in the collocation rendering of the items are acquired, the images of the to-be-displayed items may be displayed in a second image container according to the information, so that the user may view a final rendering effect of collocating the images of the to-be-displayed items.

In an example implementation manner, the step of displaying the images of the to-be-displayed items in an image container may employ the following manner: displaying the images of the to-be-displayed items in the image container sequentially by taking an ascending order of the image layer identifiers as an image display order, so as to achieve a display effect exactly the same as that of the established collocation rendering.

If the released collocation rendering of the items have a background image, before the step of displaying the images of the to-be-displayed items, the method further includes a step of displaying, in the image container, the background picture included in the collocation rendering.

After viewing the collocation rendering of the items, the user may need to switch to an item list view for viewing. Therefore, after the step of displaying the collocation rendering of the items, the method for displaying a collocation rendering of items provided in the present disclosure may further include the following steps: 1) receiving an instruction of displaying an item list effect sent by a user; and 2) displaying the images of the to-be-displayed items in a preset item list manner according to the corresponding relation between the images of the to-be-displayed items and the layout modes.

1) An instruction of displaying an item list effect sent by a user is received.

The manner of sending the instruction of displaying an item list effect includes, but is not limited to, a trigger manner of single-clicking the collocation rendering of the items and a trigger manner of double-clicking the collocation rendering of the items. The instruction may also be sent through a preset gesture, such as a pinching gesture or a 3D touch gesture.

Further, it is also possible to distinguish different gestures to determine whether to switch to an item list view directly or in a dynamic-effect manner.

2) The images of the to-be-displayed items are displayed in a preset item list manner according to the corresponding relation between the images of the to-be-displayed items and the layout modes.

The preset item list manner includes, but is not limited to, an ascending manner or a descending manner of image layer identifiers of the image layers corresponding to the images of the to-be-displayed items. Alternatively, the images of the to-be-displayed items may also be arranged randomly without considering the image layer identifiers. For example, a formed item arrangement diagram may be in a style such as a nine-grid pattern.

In an example implementation manner, after the step of receiving an instruction of displaying an item list effect sent by a user and before the step of displaying the images of the to-be-displayed items in a preset item list manner, the method may further include a step of determining whether an image layer currently displayed is an image layer of the collocation rendering of the items. If the image layer currently displayed is an image layer of the collocation rendering of the items, the step of displaying the images of the to-be-displayed items in a preset item list manner may be performed. Otherwise, as the corresponding relation between the images of the to-be-displayed items and the layout modes which is carried in the collocation rendering of the items cannot be acquired, a list of the images of the to-be-displayed items cannot be acquired, and thus an item list view cannot be generated.

In an example implementation manner, this step may include the following steps: 1) acquiring a list of the images of the to-be-displayed items according to the corresponding relation between the images of the to-be-displayed items and the layout modes; 2) establishing an item list effect image layer, and arranging the images of the to-be-displayed items on the item list effect image layer in the preset item list manner; and 3) displaying the item list effect image layer.

The step of displaying the item list effect image layer may employ the following manner: stacking the item list effect image layer above the image layers of the collocation rendering of the items. A specific manner of stacking the item list effect image layer above the image layers of the collocation rendering of the items may be complete overlapping or partial overlapping. The image layers of the collocation rendering of the items refer to image layers including the collocation rendering of the to-be-displayed items. The size of the item list effect image layer may be the same as or different from that of the image layers of the collocation rendering of the items.

It should be noted that the item list effect image layer stacked above the image layers of the collocation rendering of the items is actually a capture layer located above the image layers of the collocation rendering of the items. In an example implementation manner, the item list effect image layer may be set as a white image layer having a certain transparency. When the item list effect image layer having a certain transparency is stacked above the image layers of the collocation rendering of the items, the user may vaguely view the collocation rendering of the items; therefore, the visual experience of the user may be improved.

In addition, it should be further noted that the collocation rendering of the items generated on an e-commerce platform in the conventional techniques is generally a static collocation rendering. A process of switching from the static collocation rendering to an item list rendering is as follows: first of all, it is necessary to request acquiring a list of images of to-be-displayed items from a server; and then the images of the to-be-displayed items are displayed in a list manner according to the acquired list of the images of the to-be-displayed items. Such a switching manner has a problem that when needing to view an item list, a user may acquire the images of the to-be-displayed items only by making one page jump, and then the images are displayed to the user in a list manner. It is thus clear that in the conventional techniques, the user may switch from a collocation rendering of item images to an item image list page by using a mobile phone only by making one page jump, and therefore, the conventional techniques has a problem of relatively low efficiency in opening an item list page.

By using the method for displaying a collocation rendering of items provided in the present disclosure, a list of images of to-be-displayed items may be directly acquired according to a corresponding relation between images of to-be-displayed items which are carried in a currently displayed item collocation effect image layer and layout modes, the images of the to-be-displayed items are arranged on an established item list effect image layer, and then the item list effect image layer on which the images have been arranged is displayed. In such a processing manner, the collocation rendering of the items may be switched to the item list view without page jump, thus achieving an effect of saving the network traffic and improving the browsing efficiency.

After the step of displaying the images of the to-be-displayed items in a list manner, the method for displaying a collocation rendering of items provided in the present disclosure may further include the following steps: 1)

receiving an instruction of displaying an item collocation effect sent by a user; and 2) closing the item list effect image layer, and displaying the collocation rendering of the to-be-displayed items.

The manner of sending the instruction of displaying an item collocation effect includes, but is not limited to, a trigger manner of single-clicking the item list rendering and a trigger manner of double-clicking the item list rendering. The instruction may also be sent through a preset gesture, such as a pinching gesture or a 3D touch gesture.

In an example implementation manner, after the step of receiving an instruction of displaying an item collocation effect sent by a user and before the step of closing the item list effect image layer, the method may further include a step of determining whether an image layer currently displayed is an item list effect image layer.

A method for displaying a collocation rendering of items is provided in the above example embodiment. Corresponding to the method, the present disclosure further provides an apparatus for displaying a collocation rendering of items. The apparatus corresponds to the example embodiment of the method.

Figure 14:
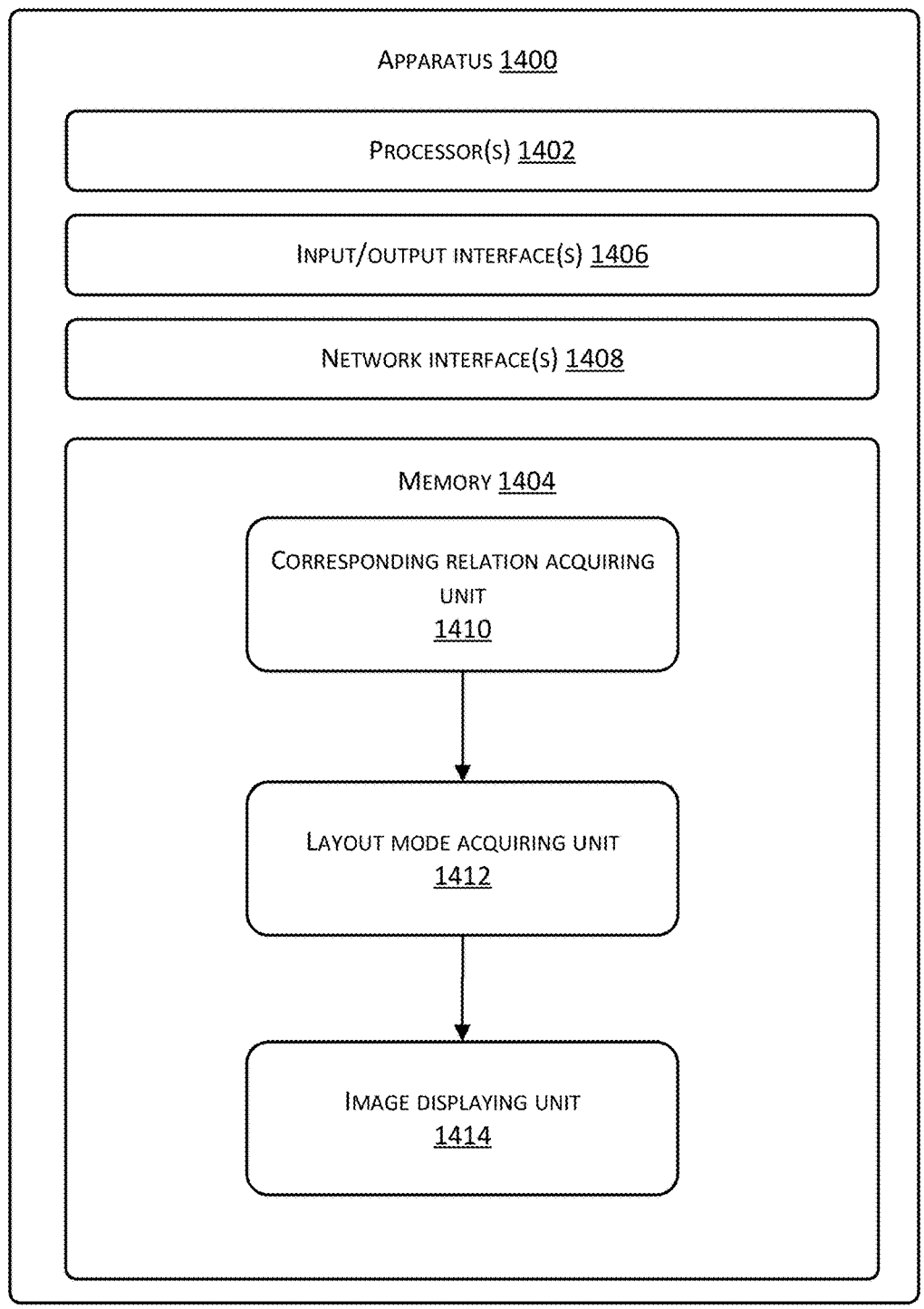
FIG. 14 is a schematic diagram of an example embodiment of an apparatus for displaying a collocation rendering of items according to the present disclosure.

Referring to FIG. 14, a schematic diagram of an example embodiment of an apparatus 1400 for displaying a collocation rendering of items according to the present disclosure is shown. An apparatus example embodiment is described simply as it is basically similar to the process example embodiment; please refer to a part of the description of the process example embodiment for related content. The apparatus example embodiment described in the following is merely illustrative.

The apparatus 1400 includes one or more processor(s) 1402 or data processing unit(s) and memory 1404. The apparatus 1400 may further include one or more input/output interface(s) 1406 and one or more network interface(s) 1408. The memory is an example of the computer readable medium or media.

The memory 1404 may store therein a plurality of modules or units including:

a corresponding relation acquiring unit 1410 configured to acquire a corresponding relation between images of to-be-displayed items and layout modes which is carried in a collocation rendering of the to-be-displayed items;

a layout mode acquiring unit 1412 configured to acquire, according to the corresponding relation between the images of the to-be-displayed items and the layout modes, layout modes of the images of the to-be-displayed items included in the collocation rendering of the to-be-displayed items in the collocation rendering of the to-be-displayed items, the layout mode including an image layer identifier, an image layer position and an image layer size of an image layer, in the collocation rendering of the to-be-displayed items, where an image of a to-be-displayed item is located; and an image displaying unit 1414 configured to display the images of the to-be-displayed items in an image container according to the layout modes corresponding to the images of the to-be-displayed items.

Optionally, the apparatus 1400 further includes the following modules or units (not shown in FIG. 14) in the memory 1404:

a first instruction receiving unit configured to receive an instruction of displaying an item list effect sent by a user; and a list page display unit configured to display the images of the to-be-displayed items in a preset item list manner according to the corresponding relation between the images of the to-be-displayed items and the layout modes.

Optionally, the apparatus 1400 further includes the following modules or units (not shown in FIG. 14) in the memory 1404:

a second instruction receiving unit configured to receive an instruction of displaying an item collocation effect sent by the user; and a list page closing unit configured to close item list effect image layers, and display the collocation rendering of the to-be-displayed items.

Figure 15:
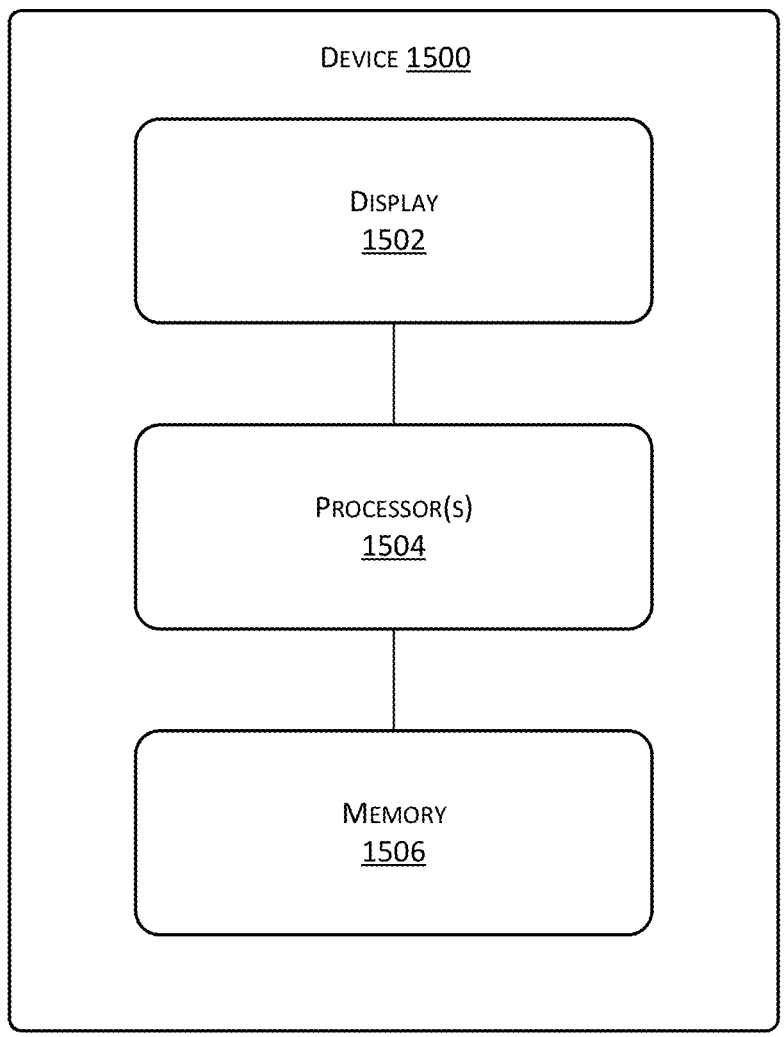
FIG. 15 is a schematic diagram of an example embodiment of yet another electronic device according to the present disclosure.

Referring to FIG. 15, a schematic diagram of an example embodiment of an electronic device according to the present disclosure is shown. A device example embodiment is described simply as it is basically similar to the process example embodiment; please refer to a part of the description of the process example embodiment for related content. The device example embodiment described in the following is merely illustrative.

In FIG. 15, a device 1500 includes a display 1502, one or more processor(s) 1504 and memory 1506 configured to store a program of a method for displaying a collocation rendering of items. After being powered on and running the program generating the method for displaying a collocation rendering of items, the device performs the following steps: filling images of to-be-displayed items into different image layers of an image container; extracting a corresponding relation between the images of the to-be-displayed items and layout modes of the images of the to-be-displayed items from the image container into which the images have been filled, the layout mode including an image layer identifier, an image layer position and an image layer size of an image layer, in the image container, where an image of a to-be-displayed item is located; and releasing a collocation rendering of the items according to the extracted corresponding relation between the images of the to-be-displayed items and the layout modes.

Although the present disclosure is disclosed as above with preferred example embodiments, the example embodiments are not intended to limit the present disclosure. Any person skilled in the art may make possible changes and modifications without departing from the spirit and scope of the present disclosure. Therefore, the protection scope of the present disclosure should be subject to the scope defined by the claims of the present disclosure.

In a typical configuration, the computing device includes one or more processors (CPU), an input/output interface, a network interface, and memory.

The memory may include a volatile memory, a random access memory (RAM) and/or a non-volatile memory or the like in a computer readable medium, for example, a read only memory (ROM) or a flash RAM. The memory is an example of the computer readable medium.

1. The computer readable medium includes non-volatile and volatile media as well as movable and non-movable media, and may implement information storage by means of any method or technology. Information may be a computer readable instruction, a data structure, a module of a program, or other data. For example, a storage medium of a computer includes, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read only memory (CD-ROM), a digital versatile disc (DVD) or other optical storages, a cassette tape, a magnetic tape/magnetic disk storage or other magnetic storage devices, or any other non-transmission media, and may be used to store information accessible to the computing device. According to the definition in this text, the computer readable medium does not include transitory media, such as modulated data signals and carriers.

2. Those skilled in the art should understand that the example embodiments of the present disclosure may be provided as methods, systems or computer program products. Therefore, the present disclosure may adopt the form of complete hardware example embodiments, complete software example embodiments or example embodiments of a combination of software and hardware. Moreover, the present disclosure may adopt the form of a computer program product implemented on one or more computer useable storage media (including, but not limited to, a magnetic disk memory, a CD-ROM, an optical memory, and so on) containing computer useable program codes.

The present disclosure may further be understood with clauses as follows.

Clause 1. A method for generating a collocation rendering, comprising:
acquiring a list of to-be-collocated transaction objects and acquiring a preset collocation template; and
generating image information of a collocation rendering of the to-be-collocated transaction objects according to collocation attribute information of the to-be-collocated transaction objects and the preset collocation template.

Clause 2. The method for generating a collocation rendering of clause 1, wherein
the collocation attribute information comprises spatial position attributes, and the preset collocation template comprises spatial position information; and
the step of generating image information of a collocation rendering of the to-be-collocated transaction objects comprises:
filling, according to the spatial position attributes of the to-be-collocated transaction objects and a pre-generated collocation rule set, images of the to-be-collocated transaction objects into corresponding spatial positions of the preset collocation template; and
generating image information of the collocation rendering according to the preset collocation template into which the images have been filled.

Clause 3. The method for generating a collocation rendering of clause 2, wherein the spatial position information comprises ground area position information and/or wall area position information.

Clause 4. The method for generating a collocation rendering of clause 1, wherein
the collocation attribute information comprises category attributes, and the preset collocation template comprises layout modes of transaction objects of a preset class; and
the step of generating image information of a collocation rendering of the to-be-collocated transaction objects comprises:
filling, according to the category attributes of the to-be-collocated transaction objects, images of the to-be-collocated transaction objects into corresponding spatial positions of the preset collocation template; and
generating image information of the collocation rendering according to the preset collocation template into which the images have been filled.

Clause 5. The method for generating a collocation rendering of clause 4, wherein the layout mode comprises an image layer identifier, an image layer position and an image layer size of an image layer, in the collocation rendering, where an image of a transaction object of the preset class is located.

Clause 6. The method for generating a collocation rendering of clause 2 or 4, wherein the step of filling images of the to-be-collocated transaction objects into corresponding spatial positions of the preset collocation template employs the following manner:
filling the images of the to-be-collocated transaction objects into different image layers of the preset collocation template.

Clause 7. The method for generating a collocation rendering of clause 6, wherein
the image information of the collocation rendering comprises layout information of the collocation rendering; and
the step of generating image information of the collocation rendering according to the preset collocation template into which the images have been filled comprises:
extracting a corresponding relation between the images and layout modes of the images from the preset collocation template into which the images have been filled; and
using the extracted corresponding relation as the layout information of the collocation rendering.

Clause 8. The method for generating a collocation rendering of clause 6, wherein there is an overlapping relation between different image layers.

Clause 9. The method for generating a collocation rendering of clause 6, wherein the images comprise static images or dynamic images, the static images comprising images with transparent data.

Clause 10. The method for generating a collocation rendering of clause 1, wherein the step of acquiring a list of to-be-collocated transaction objects and acquiring a preset collocation template comprises:
receiving a collocation rendering displaying request which is sent by a client terminal and corresponding to the list of to-be-collocated transaction objects and the preset collocation template; and
acquiring the list of to-be-collocated transaction objects and the preset collocation template according to the collocation rendering displaying request.

Clause 11. The method for generating a collocation rendering of clause 10, after the step of generating a collocation rendering of the to-be-collocated transaction objects, further comprising:
returning the image information of the collocation rendering to the client terminal.

Clause 12. The method for generating a collocation rendering of clause 1, wherein the image information of the collocation rendering comprises a picture of the collocation rendering or layout information of the collocation rendering; and the layout information of the collocation rendering comprises a corresponding relation between images of the to-be-collocated transaction objects and layout modes of the images of the to-be-collocated transaction objects in the collocation rendering.

Clause 13. The method for generating a collocation rendering of clause 1, wherein the to-be-collocated transaction objects comprise transaction objects for house decoration.

Clause 14. An apparatus for generating a collocation rendering, comprising:
a transaction object and collocation template acquiring unit configured to acquire a list of to-be-collocated transaction objects and acquire a preset collocation template; and
a collocation rendering generating unit configured to generate image information of a collocation rendering of the to-be-collocated transaction objects according to collocation attribute information of the to-be-collocated transaction objects and the preset collocation template.

Clause 15. An electronic device, comprising:

a display;

a processor; and memory, the memory being configured to store a program of a method for generating a collocation rendering, wherein after being powered on and running the program of the method for generating a collocation rendering, the device performs the following steps: acquiring a list of to-be-collocated transaction objects and acquiring a preset collocation template; and generating image information of a collocation rendering of the to-be-collocated transaction objects according to collocation attribute information of the to-be-collocated transaction objects and the preset collocation template.

Clause 16. A method for displaying a collocation rendering, comprising:

sending, to a server, a collocation rendering displaying request corresponding to a list of specific to-be-collocated transaction objects and a specific preset collocation template;

receiving image information of a collocation rendering which is returned by the server and corresponding to the collocation rendering displaying request; and displaying the collocation rendering according to the image information of the collocation rendering.

Clause 17. The method for displaying a collocation rendering of clause 16, wherein the image information of the collocation rendering comprises a picture of the collocation rendering or layout information of the collocation rendering.

Clause 18. The method for displaying a collocation rendering of clause 17, wherein the layout information of the collocation rendering comprises a corresponding relation between images of the to-be-collocated transaction objects and layout modes of the images of the to-be-collocated transaction objects in the collocation rendering; and the step of displaying the collocation rendering employs the following manner:

displaying the collocation rendering according to the corresponding relation.

Clause 19. The method for displaying a collocation rendering of clause 18, wherein the step of displaying the collocation rendering according to the corresponding relation comprises:

acquiring layout modes of the images of the to-be-collocated transaction objects in the collocation rendering according to the corresponding relation, the layout mode comprising an image layer identifier, an image layer position and an image layer size of an image layer, in the collocation rendering, where an image of a to-be-collocated transaction object is located; and displaying the images of the to-be-collocated transaction objects in an image container according to the layout modes corresponding to the images of the to-be-collocated transaction objects.

Clause 20. The method for displaying a collocation rendering of clause 19, wherein the step of displaying the images of the to-be-collocated transaction objects in an image container employs the following manner:

displaying the images of the to-be-collocated transaction objects in the image container sequentially by taking an ascending order of the image layer identifiers as an image display order.

Clause 21. The method for displaying a collocation rendering of clause 19, before the step of displaying the images of the to-be-collocated transaction objects, further comprising:

displaying, according to a background picture comprised in information of the collocation rendering, the background picture in the image container.

Clause 22. The method for displaying a collocation rendering of clause 17, further comprising:

receiving a list page display instruction sent by a user; and displaying a list page of the to-be-collocated transaction objects in a preset list manner according to the layout information of the collocation rendering.

Clause 23. The method for displaying a collocation rendering of clause 22, wherein the step of displaying a list page of the to-be-collocated transaction objects in a preset list manner comprises:

acquiring images of the to-be-collocated transaction objects according to the layout information of the collocation rendering;

establishing a list page image layer, and arranging the images of the to-be-collocated transaction objects on the list page image layer in the preset list manner; and displaying the list page image layer.

Clause 24. The method for displaying a collocation rendering of clause 23, wherein the step of displaying the list page image layer employs the following manner:

stacking the list page image layer above the image layers of the collocation rendering.

Clause 25. The method for displaying a collocation rendering of clause 24, wherein the list page image layer is of the same size as the image layers of the collocation rendering.

Clause 26. The method for displaying a collocation rendering of clause 22, wherein the preset list manner comprises an ascending manner or a descending manner of image layer identifiers of image layers corresponding to images of the to-be-collocated transaction objects.

Clause 27. The method for displaying a collocation rendering of clause 22, after the step of receiving a list page display instruction sent by a user, further comprising:

determining whether an image layer currently displayed is an image layer of the collocation rendering; and if yes, performing the next step.

Clause 28. The method for displaying a collocation rendering of clause 22, wherein the manner of sending the list page display instruction comprises a manner of sending the instruction through a preset gesture.

Clause 29. The method for displaying a collocation rendering of clause 22, wherein the step of displaying a list page of the to-be-collocated transaction objects employs the following manner:

displaying the list page of the to-be-collocated transaction objects in a dynamic-effect manner if the manner of sending the list page display instruction is a specific gesture corresponding to a spread dynamic-effect manner.

Clause 30. An apparatus for displaying a collocation rendering, comprising:

a request sending unit configured to send, to a server, a collocation rendering displaying request corresponding to a list of specific to-be-collocated transaction objects and a specific preset collocation template;

an image information receiving unit configured to receive image information of a collocation rendering which is returned by the server and corresponding to the collocation rendering displaying request; and an image displaying unit configured to display the collocation rendering according to the image information of the collocation rendering.

Clause 31. An electronic device, comprising:

a display;

a processor; and memory configured to store a program of a method for displaying a collocation rendering, wherein after being powered on and running the program of the method for displaying a collocation rendering, the device performs the following steps: sending, to a server, a collocation rendering displaying request corresponding to a list of specific to-be-collocated transaction objects and a specific preset collocation template; receiving image information of a collocation rendering which is returned by the server and corresponding to the collocation rendering displaying request; and displaying the collocation rendering according to the image information of the collocation rendering.

Clause 32. A system for displaying a collocation rendering, comprising the apparatus for generating a collocation rendering of clause 14, and the apparatus for displaying a collocation rendering of clause 30.

Clause 33. A method for generating a collocation rendering of items, comprising:

filling images of to-be-displayed items into different image layers of an image container;

extracting a corresponding relation between the images of the to-be-displayed items and layout modes of the images of the to-be-displayed items from the image container into which the images have been filled, the layout mode comprising an image layer identifier, an image layer position and an image layer size of an image layer, in the image container, where an image of a to-be-displayed item is located; and releasing a collocation rendering of the items according to the extracted corresponding relation between the images of the to-be-displayed items and the layout modes.

Clause 34. The method for generating a collocation rendering of items of clause 33, wherein the step of filling images of to-be-displayed items into different image layers of an image container employs the following manner:

filling the images of the to-be-displayed items into random positions of the image container, images of different to-be-displayed items corresponding to different image layers; and correspondingly, the step of extracting a corresponding relation between the images of the to-be-displayed items and layout modes of the images of the to-be-displayed items from the image container into which the images have been filled comprises:

determining, according to a filling order of the images of the to-be-displayed items, image identifiers of the image layers where the images of the to-be-displayed items are located;

acquiring display positions and display sizes of the image layers in the image container;

forming layout modes of the image layers according to the image layer identifiers, the display positions and the display sizes of the image layers; and forming the corresponding relation between the images of the to-be-displayed items and the layout modes according to the layout modes of the image layers and the images of the to-be-displayed items which have been filled in the image layers.

Clause 35. An apparatus for generating a collocation rendering of items, comprising:

an image filling unit configured to fill images of to-be-displayed items into different image layers of an image container;

a corresponding relation extracting unit configured to extract a corresponding relation between the images of the to-be-displayed items and layout modes of the images of the to-be-displayed items from the image container into which the images have been filled, the layout mode comprising an image layer identifier, an image layer position and an image layer size of an image layer, in the image container, where an image of a to-be-displayed item is located; and an image release unit configured to release a collocation rendering of the items according to the extracted corresponding relation between the images of the to-be-displayed items and the layout modes.

Clause 36. An electronic device, comprising:

a display;

a processor; and memory configured to store a program of a method for generating a collocation rendering of items, wherein after being powered on and running the program generating the method for generating a collocation rendering, the device performs the following steps: filling images of to-be-displayed items into different image layers of an image container; extracting a corresponding relation between the images of the to-be-displayed items and layout modes of the images of the to-be-displayed items from the image container into which the images have been filled, the layout mode comprising an image layer identifier, an image layer position and an image layer size of an image layer, in the image container, where an image of a to-be-displayed item is located; and releasing a collocation rendering of the items according to the extracted corresponding relation between the images of the to-be-displayed items and the layout modes.

Clause 37. A method for displaying a collocation rendering of items, comprising:

acquiring a corresponding relation between images of to-be-displayed items and layout modes which is carried in a collocation rendering of the to-be-displayed items;

acquiring, according to the corresponding relation between the images of the to-be-displayed items and the layout modes, layout modes of the images of the to-be-displayed items comprised in the collocation rendering of the to-be-displayed items in the collocation rendering of the to-be-displayed items, the layout mode comprising an image layer identifier, an image layer position and an image layer size of an image layer, in the collocation rendering of the to-be-displayed items, where an image of a to-be-displayed item is located; and displaying the images of the to-be-displayed items in an image container according to the layout modes corresponding to the images of the to-be-displayed items.

Clause 38. An apparatus for displaying a collocation rendering of items, comprising:

a corresponding relation acquiring unit configured to acquire a corresponding relation between images of to-be-displayed items and layout modes which is carried in a collocation rendering of the to-be-displayed items;

a layout mode acquiring unit configured to acquire, according to the corresponding relation between the images of the to-be-displayed items and the layout modes, layout modes of the images of the to-be-displayed items comprised in the collocation rendering of the to-be-displayed items in the collocation rendering of the to-be-displayed items, the layout mode comprising an image layer identifier, an image layer position and an image layer size of an image layer, in the collocation rendering of the to-be-displayed items, where an image of a to-be-displayed item is located; and an image displaying unit configured to display the images of the to-be-displayed items in an image container according to the layout modes corresponding to the images of the to-be-displayed items.

Clause 39. An electronic device, comprising:
a display;
a processor; and
memory configured to store a program of a method for displaying a collocation rendering of items, wherein after being powered on and running the program generating the method for displaying a collocation rendering of items, the device performs the following steps: filling images of to-be-displayed items into different image layers of an image container; extracting a corresponding relation between the images of the to-be-displayed items and layout modes of the images of the to-be-displayed items from the image container into which the images have been filled, the layout mode comprising an image layer identifier, an image layer position and an image layer size of an image layer, in the image container, where an image of a to-be-displayed item is located; and releasing a collocation rendering of the items according to the extracted corresponding relation between the images of the to-be-displayed items and the layout modes.

What is claimed is:

1. A method comprising:
   acquiring a list of objects and a preset collocation template from a plurality of preset colocation templates according to characteristics of the objects from the list, the preset collocation template including:
      spatial position information, wherein the spatial position information pre-defines spatial positions in the preset collocation template where images of the objects are allowed to be filled, and
      layout modes of the objects, the layout modes comprising an image layer identifier, an image layer position and an image layer size of each image layer where an image of an object from the list of objects is located in a collocation rendering of the objects; and
   generating image information of the collocation rendering of the objects including the images of the objects according to collocation attribute information of the objects and the preset collocation template based on filling the images of the objects into corresponding pre-defined spatial positions in corresponding image layers of the preset collocation template according to the layout modes of the objects and a pre-generated collocation rule set associated with the objects, the pre-generated collocation rule defining allowed placement of the objects relative to each other.

2. The method of claim 1, wherein:
   the collocation attribute information comprises spatial position attributes; and
   the generating the image information of the collocation rendering of the objects comprises:
      filling, according to the spatial position attributes of the objects and the pre-generated collocation rule set, the images of the objects into corresponding pre-defined spatial positions of the preset collocation template.

3. The method of claim 2, wherein the spatial position information comprises ground area position information or wall area position information.

4. The method of claim 1, wherein:
   the collocation attribute information comprises the category attributes; and
   the generating the image information of the collocation rendering of the objects comprises:
      generating the image information of the collocation rendering according to the preset collocation template into which the images have been filled.

5. The method of claim 4, wherein:
   the image information of the collocation rendering comprises layout information of the collocation rendering; and
   the generating the image information of the collocation rendering according to the preset collocation template into which the images have been filled comprises:
      extracting a corresponding relation between the images and layout modes of the images from the preset collocation template into which the images have been filled; and
      using the extracted corresponding relation as the layout information of the collocation rendering.

6. The method of claim 1, wherein there is an overlapping relation between different image layers.

7. The method of claim 1, wherein the images includes at least one of:
   static images, the static images comprising images with transparent data, or dynamic images.

8. The method of claim 1, wherein the acquiring the list of the objects and acquiring the preset collocation template comprises:
   receiving a collocation rendering displaying request which is sent by a client terminal and corresponds to the list of the objects and the preset collocation template; and
   acquiring the list of the objects and the preset collocation template according to the collocation rendering displaying request.

9. The method of claim 8, further comprising returning the image information of the collocation rendering to the client terminal.

10. The method of claim 1, wherein:
    the image information of the collocation rendering comprises a picture of the collocation rendering or layout information of the collocation rendering; and
    the layout information of the collocation rendering comprises a corresponding relation between the images of the objects and layout modes of the images of the objects in the collocation rendering.

11. An apparatus comprising:
    one or more processors; and
    one or more memory storing thereon computer-readable instructions that, when executed by the one or more processors, cause the one or more processors to perform acts comprising:
       sending, to a server, a collocation rendering displaying request corresponding to a list of specific objects and a specific preset collocation template from a plurality of preset colocation templates according to characteristics of the specific objects from the list, the specific preset collocation template including:
          spatial position information, wherein the spatial position information predefines spatial positions in the specific preset collocation template where images of the specific objects are allowed to be filled, and
          layout modes of the specific objects, the layout modes comprising an image layer identifier, an image layer position and an image layer size of each image layer, where an image of a specific object of the list located in a collocation rendering of the specific objects;

receiving image information of the collocation rendering that is returned by the server and corresponds to the collocation rendering displaying request, the image information based on filling the images of the specific objects into corresponding pre-defined spatial positions in different image layers of the specific preset collocation template according to category attributes of the specific objects and on a pre-generated collocation rule set associated with the specific objects, the pre-generated collocation rule defining allowed placement of the specific objects relative to each other; and displaying the collocation rendering according to the image information of the collocation rendering.

12. The apparatus of claim 11, wherein the image information of the collocation rendering comprises a picture of the collocation rendering or layout information of the collocation rendering.

13. The apparatus of claim 12, wherein:

the layout information of the collocation rendering comprises a corresponding relation between the images of the specific objects and the layout modes of the images of the specific objects in the collocation rendering; and the displaying the collocation rendering comprises displaying the collocation rendering according to the corresponding relation.

14. The apparatus of claim 13, wherein the displaying the collocation rendering according to the corresponding relation comprises:

acquiring the layout modes of the images of the specific objects in the collocation rendering according to the corresponding relation; and displaying the images of the specific objects in an image container according to the layout modes corresponding to the images of the specific objects.

15. The apparatus of claim 14, wherein the displaying the images of the specific objects in the image container comprises displaying the images of the specific objects in the image container sequentially by taking an ascending order of the image layer identifiers as an image display order.

16. The apparatus of claim 15, wherein the acts further comprise:

receiving a list page display instruction sent by a user; and displaying a list page of the specific objects in a preset list manner according to the layout information of the collocation rendering.

17. The apparatus of claim 11, wherein images of the specific objects include at least one of:

static images of the specific items, the static images of the items including images of the specific items with transparent data, or dynamic images of the specific items.

18. One or more computer readable media storing thereon computer-readable instructions that, when executed by one or more processors, cause the one or more processors to perform acts comprising:

acquiring items and a collocation template from a plurality of preset collocation templates according to characteristics of the items, the collocation template including spatial position information, wherein the spatial position information pre-defines spatial positions in the collocation template where images of the items are allowed to be filled;

displaying the collocation template in an image container;

filling the images of the items into corresponding pre-defined spatial positions in different image layers of the collocation template in the image container based on a pre-generated collocation rule set associated with the objects, the pre-generated collocation rule defining allowed placement of the items relative to each other;

extracting a corresponding relation between the images of the items and layout modes of the images of the items from the image container into which the images have been filled, the layout mode comprising an image layer identifier, an image layer position and an image layer size of each image layer in the image container where an image of an item is located; and releasing the collocation rendering of the items according to the extracted corresponding relation between the images of the items and the layout modes.

19. The one or more computer readable media of claim 18, wherein the step of extracting the corresponding relation between the images of the items and the layout modes of the images of the items from the image container into which the images have been filled comprises:

determining, according to a filling order of the images of the items, image identifiers of the image layers where the images of the items are located;

acquiring display positions and display sizes of the image layers in the image container;

forming layout modes of the image layers according to the image layer identifiers, the display positions and the display sizes of the image layers; and forming the corresponding relation between the images of the items and the layout modes according to the layout modes of the image layers and the images of the items which have been filled in the image layers.

20. The one or more computer readable media of claim 18, wherein the images of the items include at least one of:

static images of the items, the static images of the items including images of the items with transparent data, or dynamic images of the items.

* * * * *